US012686450B2

(12) United States Patent
Tambo et al.

(10) Patent No.: US 12,686,450 B2
(45) Date of Patent: Jul. 21, 2026

(54) WORKING VEHICLE

(71) Applicant: KUBOTA CORPORATION, Osaka (JP)

(72) Inventors: Toru Tambo, Sakai (JP); Shunsuke Miyashita, Sakai (JP); Yasuaki Morioka, Sakai (JP); Kunihiko Nishino, Sakai (JP); Misako Kikumoto, Sakai City (JP)

(73) Assignee: KUBOTA CORPORATION, Osaka (JP)

( * ) Notice: Subject to any disclaimer, the term of this patent is extended or adjusted under 35 U.S.C. 154(b) by 445 days.

(21) Appl. No.: 18/209,576

(22) Filed: Jun. 14, 2023

(65) Prior Publication Data

US 2023/0339557 A1 Oct. 26, 2023

Related U.S. Application Data

(63) Continuation of application No. PCT/JP2021/047618, filed on Dec. 22, 2021.

(30) Foreign Application Priority Data

Dec. 29, 2020 (JP) ................................. 2020-219798

(51) Int. Cl.
*B62D 49/06* (2006.01)
*A01B 69/00* (2006.01)
(Continued)

(52) U.S. Cl.
CPC ........ *B62D 49/0692* (2013.01); *A01B 69/007* (2013.01); *A01B 69/008* (2013.01);
(Continued)

(58) Field of Classification Search
CPC . B62D 49/0692; A01B 69/007; A01B 69/008; A01B 69/00; A01B 69/004;
(Continued)

(56) References Cited

U.S. PATENT DOCUMENTS

2020/0383261 A1 12/2020 Miyashita et al.

FOREIGN PATENT DOCUMENTS

JP 2007-054006 A 3/2007
JP 2009-055809 A 3/2009
(Continued)

OTHER PUBLICATIONS

Espace translation of JP 2010 202014 A (Year: 2010).*
(Continued)

*Primary Examiner* — Vivek D Koppikar
*Assistant Examiner* — Scott Lawrence Strickler
(74) *Attorney, Agent, or Firm* — Keating & Bennett, LLP

(57) ABSTRACT

To reduce complexity of operation when a working vehicle performs automatic steering, the working vehicle includes a vehicle body to be manually steered with a steering wheel or automatically steered to travel forward or rearward, an operator's seat on the vehicle body, a console located forward of the operator's seat or located on one side of the operator's seat, a first manual operator for automatic steering provided in or on the console, and a second manual operator for automatic steering attachable at a location rearward of the operator's seat.

20 Claims, 12 Drawing Sheets

(51) Int. Cl.
    *A01B 69/04*        (2006.01)
    *B60R 16/023*      (2006.01)
    *B60R 21/13*        (2006.01)
    *B60R 21/00*        (2006.01)

(52) U.S. Cl.
    CPC ........ *B60R 16/0231* (2013.01); *B60R 21/131*
           (2013.01); *B60R 2021/0018* (2013.01); *B60R*
                             *2021/0076* (2013.01)

(58) Field of Classification Search
    CPC .............. B60R 16/0231; B60R 21/131; B60R
                       2021/0018; B60R 2021/0076
    See application file for complete search history.

(56)                 References Cited

FOREIGN PATENT DOCUMENTS

| | | | | |
|---|---|---|---|---|
| JP | 2010202014 | A | * | 9/2010 |
| JP | 2012-065615 | A | | 4/2012 |
| JP | 2020001467 | A | * | 1/2020 |

OTHER PUBLICATIONS

Espace translation of JP 2020 001467 A (Year: 2020).*
Official Communication issued in International Patent Application
No. PCT/JP2021/047618, mailed on Mar. 22, 2022.

* cited by examiner

WORKING VEHICLE

CROSS REFERENCE TO RELATED APPLICATIONS

This application is a continuation application of International Application No. PCT/JP2021/047618, filed on Dec. 22, 2021, which claims the benefit of priority to Japanese Patent Application No. 2020-219798, filed on Dec. 29, 2020. The entire contents of each of these applications are hereby incorporated herein by reference.

BACKGROUND OF THE INVENTION

1. Field of the Invention

The present invention relates to, for example, a working vehicle such as a tractor.

2. Description of the Related Art

A working vehicle disclosed in Japanese Unexamined Patent Application Publication No. 2020-1467 is known. The working vehicle of Japanese Unexamined Patent Application Publication No. 2020-1467 includes a manual operator (correction switch) for automatic steering that is operable when it is attached to a console and that can be detached from the console, moved to a location rearward of the operator's seat, and then operated at that location.

SUMMARY OF THE INVENTION

With regard to the working vehicle of Japanese Unexamined Patent Application Publication No. 2020-1467, when automatic steering is performed, the operator moves the manual operator (correction switch) for automatic steering according to the direction of travel of the vehicle body. This moving action is sometimes complicated.

Preferred embodiments of the present invention make it possible to reduce complexity of operation when automatic steering of the working vehicle is performed.

Technical solutions according to preferred embodiments of the present invention are as follows.

A working vehicle according to an aspect of a preferred embodiment of the present invention includes a vehicle body to be manually steered with a steering wheel or automatically steered to travel forward or rearward, an operator's seat on the vehicle body a console located forward of the operator's seat or located on one side of the operator's seat, a first manual operator for automatic steering provided in or on the console, and a second manual operator for automatic steering attachable at a location rearward of the operator's seat.

In an aspect of a preferred embodiment of the present invention, the first manual operator and the second manual operator may include respective steering switches to be operated to issue an instruction to start or stop the automatic steering.

In an aspect of a preferred embodiment of the present invention, the working vehicle may further include a position detector to detect a position of the vehicle body. The first manual operator may include a first defining switch to be operated to issue an instruction to define a reference travel line based on which the automatic steering is performed, and a first correction switch to be operated to issue an instruction to correct the position of the vehicle body detected by the position detector, or the first manual operator and the second manual operator may include respective defining switches to be operated to issue an instruction to define a reference travel line based on which the automatic steering is performed, and respective correction switches to be operated to issue an instruction to correct the position of the vehicle body detected by the position detector.

In an aspect of a preferred embodiment of the present invention, the working vehicle may further include a controller to control the automatic steering. The controller may be configured or programmed to define, upon operation of the first defining switch or one of the respective defining switches at a start and end of travel of the vehicle body in which the vehicle body is manually steered, the reference travel line based on positions of the vehicle body detected by the position detector, start the automatic steering upon operation of one of the respective steering switches to start the automatic steering, stop the automatic steering upon operation of one of the respective steering switches to stop the automatic steering, correct a position of the vehicle body upon operation of the first correction switch or one of the respective correction switches, and upon operation of one of the respective switches of the first manual operator and the second manual operator having a same function, disable another of the respective switches of the first manual operator and the second manual operator until the automatic steering ends.

In an aspect of a preferred embodiment of the present invention, the second manual operator may be electrically connected to the controller by an electric wire routed from the location rearward of the operator's seat to the console through a side portion of the vehicle body.

In an aspect of a preferred embodiment of the present invention, the working vehicle may further include a protection structure to protect the operator's seat. The second manual operator may be attachable to and detachable from the protection structure.

In an aspect of a preferred embodiment of the present invention, the protection structure may include pillars extending upward from a left rear portion and a right rear portion of the vehicle body, respectively, and a beam connecting upper ends of the pillars. The second manual operator may include a housing attachable to and detachable from any of the pillars, and an operable key provided on a surface of the housing other than a mount surface for contact with the pillar.

In an aspect of a preferred embodiment of the present invention, the working vehicle may further include a falling preventer to prevent the second manual operator from falling out of the protection structure.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
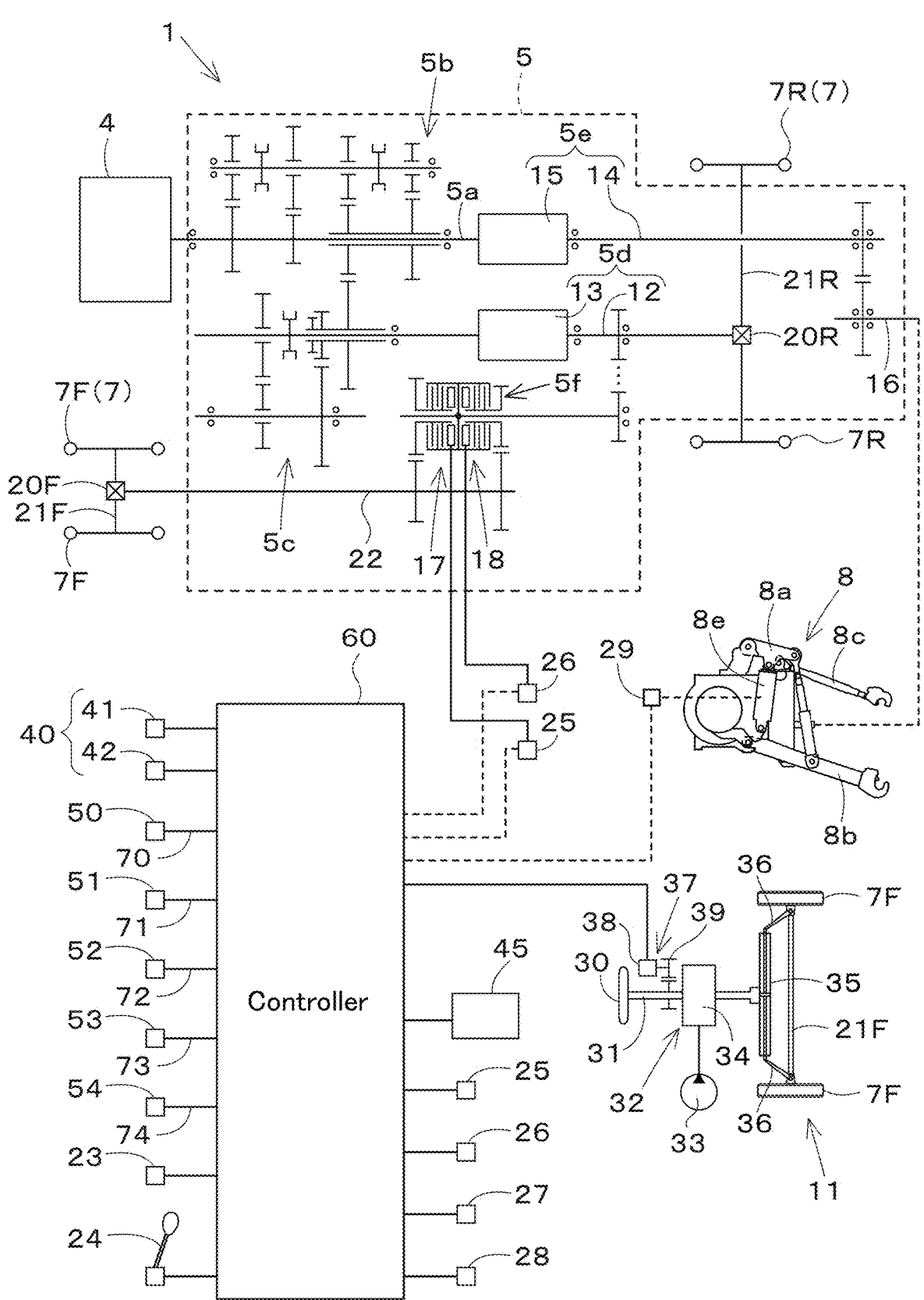
FIG. 1 is a control block diagram of a working vehicle.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of the present invention with reference to the drawings.

Figure 12:
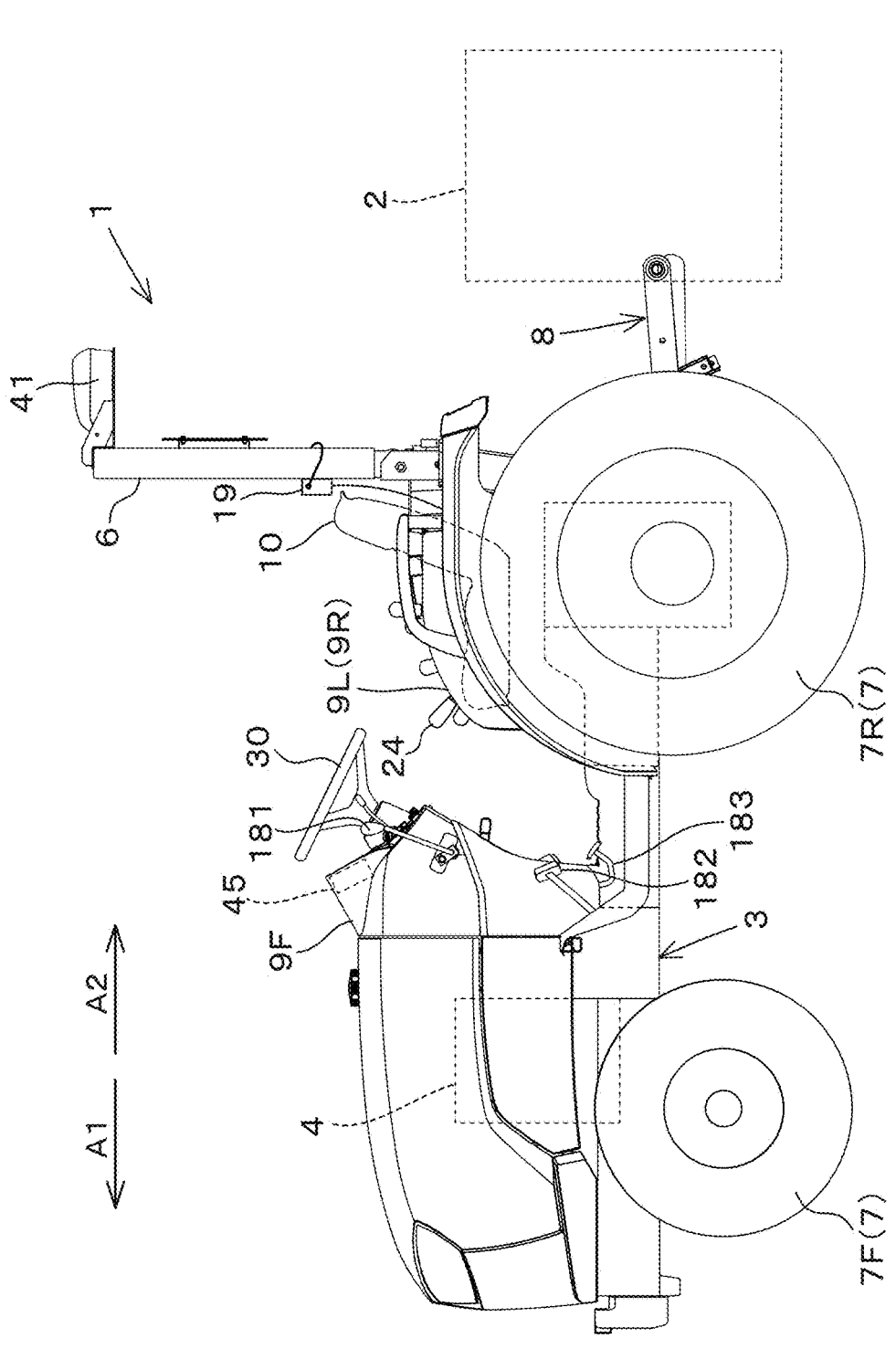
FIG. 12 is a side view of a working vehicle.

The appearance of a working vehicle 1 according to a preferred embodiment is discussed first. FIG. 12 is a side view of the working vehicle 1. The working vehicle 1 according to the present preferred embodiment is a tractor. Note, however, that working vehicles of the present invention are not limited to a tractor as illustrated in FIG. 12, and may be an agricultural machine (agricultural vehicle) such as a combine or a transplanter or a construction machine (construction vehicle) such as a loader working machine.

In the following description, a forward direction from an operator seated on an operator's seat 10 of the working vehicle 1 (the direction indicated by arrow A1 in FIG. 12) is referred to as a forward direction, a rearward direction from the operator (the direction indicated by arrow A2 in FIG. 12) is referred to as a rearward direction, a leftward direction from the operator is referred to as a leftward direction, and a rightward direction from the operator is referred to as a rightward direction. Furthermore, a horizontal direction orthogonal to the front-rear direction of the working vehicle 1 is referred to as a vehicle body width direction.

As illustrated in FIG. 12, the working vehicle 1 includes a vehicle body 3, a prime mover 4, and a traveling device 7. The vehicle body 3 is caused by the traveling device 7 to travel forward and rearward. The traveling device 7 includes front wheels 7F and rear wheels 7R. The front wheels 7F may be tire wheels and may be crawler wheel(s). The rear wheels 7R also may be tire wheels and may be crawler wheel(s). The prime mover 4 includes a diesel engine. For another example, the prime mover 4 may include an electric motor and/or the like.

The vehicle body 3 is provided with the operator's seat 10 at an upper portion thereof. The vehicle body 3 is provided, at a rear portion thereof, with a linkage portion (not illustrated) including a lifting device 8. The linkage portion can have a working implement 2 attached thereto and detached therefrom. When the working implement 2 is connected to the linkage portion, the working implement 2 is supported at the rear of the vehicle body 3, making it possible to allow the vehicle body 3 to tow the working implement 2. The working implement 2 is a cultivator for cultivation, a fertilizer spreader to spread fertilizer, an agricultural chemical spreader to spread agricultural chemicals, a harvester for harvesting, a mower to mow grass or the like, a tedder to ted grass or the like, a rake to rake grass or the like, a baler to bale grass or the like, and/or the like.

There is a console 9F in front of the operator's seat 10 of the vehicle body 3. The console 9F is provided with manual operator(s) such as a steering wheel 30, lever(s), and/or switch(es). There is a console 9L located leftward of the operator's seat 10, and there is a console 9R located rightward of the operator's seat 10 (see FIG. 7, discussed later). The consoles 9L and 9R are each also provided with manual operator(s) such as lever(s) and/or switch(es).

There is a rollover protection structure (ROPS) 6 located rearward of the operator's seat 10 on the vehicle body 3. The ROPS 6 is an example of a protection structure to protect the operator seated on the operator's seat 10 when, for example, the working vehicle 1 rolls over.

The following discusses a configuration of the working vehicle 1. FIG. 1 is a control block diagram of the working vehicle 1. The working vehicle 1 includes a transmission 5, differentials 20F and 20R, a lifting device 8, a steering unit 11, a controller 60, a position detector 40, a display 45, actuation valves 25 to 29, and switches 23, 24, and 50 to 54.

The transmission 5 is operable to change propelling force for the traveling device 7 by changing speed stages and to change the direction of travel of the traveling device 7 between forward and rearward directions. The transmission 5 includes a propeller shaft (main shaft) 5a, a main transmission portion 5b, an auxiliary transmission portion 5c, a shuttle portion 5d, a PTO power transmitting portion 5e, and a front transmission portion 5f. The propeller shaft 5a is rotatably supported on a housing case (transmission case) of the transmission 5. The propeller shaft 5a receives power from the crankshaft of the prime mover 4. The main transmission portion 5b includes gears and a shifter to change the connection of the gears. The main transmission portion 5b is such that when the connection (engagement) of the gears is changed appropriately using the shifter, the main transmission portion 5b changes the rotation inputted from the propeller shaft 5a and outputs it (changes speed stages).

The auxiliary transmission portion 5c includes gears and a shifter to change the connection of the gears, similar to the main transmission portion 5b. The auxiliary transmission portion 5c is such that when the connection (engagement) of the gears is changed appropriately using the shifter, the auxiliary transmission portion 5c changes the rotation inputted from the main transmission portion 5b and outputs it (changes speed stages).

The shuttle portion 5d includes a shuttle shaft 12 and a forward-and-rearward clutch 13. The shuttle shaft 12 receives power from the auxiliary transmission portion 5c via gear(s) and/or the like. The forward-and-rearward clutch 13 includes, for example, a hydraulic clutch and/or the like. The forward-and-rearward clutch 13 is connected to a fluid passage which is connected to the actuation valve 28. The actuation valve 28 is supplied with hydraulic fluid delivered by a hydraulic pump 33. The forward-and-rearward clutch 13 is switched between an engaged state and a disengaged state depending on the opening of the actuation valve 28. The actuation valve 28 is, for example, a two-position switching valve with a solenoid valve. The energization or de-energization of the solenoid of the solenoid valve of the actuation valve 28 brings the forward-and-rearward clutch 13 into the engaged state or the disengaged state.

Switching of the forward-and-rearward clutch 13 between the engaged state and the disengaged state changes the direction of rotation of the shuttle shaft 12. The shuttle shaft 12 is connected to the rear wheel differential 20R. The rear wheel differential 20R rotatably supports a rear axle 21R having attached thereto the rear wheels 7R.

The PTO (power take-off) power transmitting portion 5e includes a PTO propeller shaft 14 and a PTO clutch 15. The PTO propeller shaft 14 is rotatably supported, and can receive power from the propeller shaft 5a. The PTO propeller shaft 14 is connected to a PTO shaft 16 via gear(s) and/or the like.

The PTO clutch 15 includes, for example, a hydraulic clutch and/or the like. The PTO clutch 15 is connected to a fluid passage which is connected to the actuation valve 27. The actuation valve 27 is supplied with hydraulic fluid delivered by the hydraulic pump 33. The PTO clutch 15 is switched between an engaged state and a disengaged state depending on the opening of the actuation valve 27. The actuation valve 27 is, for example, a two-position switching valve with a solenoid valve. The energization or de-energization of the solenoid of the solenoid valve of the actuation valve 27 brings the PTO clutch 15 into the engaged state or the disengaged state.

Switching of the PTO clutch 15 between the engaged state and the disengaged state switches between a state in which power from the propeller shaft 5a is transmitted to the PTO propeller shaft 14 and a state in which power from the propeller shaft 5a is not transmitted to the PTO propeller shaft 14. The transmission of power from the prime mover 4 to the PTO shaft 16 via the propeller shaft 5a, the PTO clutch 15, and the PTO propeller shaft 14 drives and rotates the PTO shaft 16. The PTO shaft 16 is connected to the lifting device 8 and the working implement 2. The transmission of driving force from the PTO shaft 16 to the lifting device 8 and the working implement 2 actuates the lifting device 8 and the working implement 2.

The front transmission portion 5f includes a first clutch 17 and a second clutch 18. The first clutch 17 and the second clutch 18 can receive power from the propeller shaft 5a and, for example, receive power from the shuttle shaft 12 via gear(s) and transmission shaft(s). The power from the first clutch 17 and the second clutch 18 is transmitted to a front axle 21F via a front transmission shaft 22. Specifically, the front transmission shaft 22 is connected to the front wheel differential 20F which rotatably supports the front axle 21F having attached thereto the front wheels 7F.

The first clutch 17 and the second clutch 18 each include a hydraulic clutch and/or the like. The first clutch 17 is connected to a fluid passage which is connected to the actuation valve 25. The actuation valve 25 is supplied with hydraulic fluid delivered by the hydraulic pump 33. The first clutch 17 switches between its engaged state and disengaged state depending on the opening of the actuation valve 25. The second clutch 18 is connected to a fluid passage which is connected to the actuation valve 26. The actuation valve 26 is supplied with hydraulic fluid delivered by the hydraulic pump 33. The second clutch 18 switches between its engaged state and the disengaged state depending on the opening of the actuation valve 26. The actuation valves 25 and 26 are each, for example, a two-position switching valve with a solenoid valve. The energization or the de-energization of the solenoid of the solenoid valve of each of the actuation valves 25 and 26 switches a corresponding one of the clutches 17 and 18 between the engaged state and the disengaged state.

In the case where the first clutch 17 is in the disengaged state and the second clutch 18 is in the engaged state, power from the shuttle shaft 12 is transmitted to the front wheels 7F via the second clutch 18. This results in the state in which the front wheels 7F and the rear wheels 7R are driven and the rotation speed of the front wheels 7F and the rotation speed of the rear wheels 7R are substantially the same (such a state is referred to as a four-wheel-drive-and-equal-speed state, or "4WD equal speed state"). In contrast, in the case where the first clutch 17 is in the engaged state and the second clutch 18 is in the disengaged state, this results in the state in which the front wheels 7F and the rear wheels 7R are driven but the rotation speed of the front wheels 7F is higher than the rotation speed of the rear wheels 7R (such a state is referred to as a four-wheel-drive-and-speed-increasing state, or "4WD speed-increasing state"). In the case where both the first clutch 17 and the second clutch 18 are in the disengaged state, the power from the shuttle shaft 12 is not transmitted to the front wheels 7F. This results in the state in which only the rear wheels 7R are driven (such a state is referred to as a "two-wheel drive (2WD) state").

That is, the power from the prime mover 4 is transmitted to the shuttle shaft 12 via the propeller shaft 5a, the main transmission portion 5b, the auxiliary transmission portion 5c, and the forward-and-rearward clutch 13 to rotate the shuttle shaft 12 in its forward direction or reverse direction to drive the rear wheel differential 20R, thus rotating the rear axle 21R and the rear wheels 7R in the forward direction or reverse direction. The power from the prime mover 4 is transmitted from the shuttle shaft 12 to the front transmission shaft 22 via the clutch(es) 17 and/or 18 to rotate the front transmission shaft 22 in its forward direction or reverse direction to drive the front wheel differential 20F, thus rotating the front axle 21F and the front wheels 7F in the forward direction or reverse direction. This causes the vehicle body 3, i.e., the working vehicle 1, to travel forward or rearward.

The lifting device 8 includes one or more lift arms 8a, one or more lower links 8b, at least one top link 8c, one or more lift rods (not illustrated), and one or more lift cylinders 8e. The front ends of the lift arms 8a are supported on an upper rear portion of a case (transmission case) housing the transmission 5 such that the lift arms 8a are swingable up and down. The lift arms 8a are driven by the lift cylinders 8e to swing (raised or lowered). The lift cylinders 8e are hydraulic cylinders. The lift cylinders 8e are connected to the hydraulic pump 33 via the control valve 29. The control valve 29 is, for example, a solenoid valve and/or the like, and causes the lift cylinders 8e to extend and retract.

The front ends of the lower links 8b are supported on a lower rear portion of the transmission 5 such that the lower links 8b are swingable up and down. The front end of the top link 8c is supported, at a position higher than the lower links 8b, on a rear portion of the transmission 5 such that the top link 8c is swingable up and down. The lift rods connect the lift arms 8a and the lower links 8b. The rear ends of the lower links 8b and the top link 8c are linked to the working implement 2. When the lift cylinders 8e are driven (extend or retract), the lift arms 8a ascend or descend, and the lower links 8b connected to the lift arms 8a via the lift rods 8d also ascend or descend. With this, the working implement 2 swings (is raised or lowered) up or down about the front portions of the lower links 8b. Note that the working vehicle 1 includes an automatic lifter to raise the lifting device 8 upon rearward travel of the vehicle body 3. In the present preferred embodiment, the automatic lifter includes the lift cylinders 8e and the control valve 29.

The position detector 40 is operable to detect the position thereof (measured position information including latitude and longitude) using a satellite positioning system (positioning satellite(s)) such as D-GPS, GPS, GLONASS, BeiDou, Galileo, and/or Michibiki. Specifically, the position detector 40 receives satellite signal(s) (position(s) of positioning satellite(s), time of transmission, correction information, and/or the like) sent from positioning satellite(s) and detects the position (for example, latitude and longitude) based on the satellite signal(s). The position detector 40 includes a receiver 41 and an inertial measurement unit (IMU) 42. The receiver 41 includes an antenna and/or the like and receives satellite signal(s) from positioning satellite(s). The receiver 41 is attached to, for example, the ROPS 6 (FIG. 12).

The inertial measurement unit 42 includes an acceleration sensor to detect acceleration, a gyroscope sensor to detect angular velocity, and/or the like. It is possible to detect the roll angle, pitch angle, yaw angle, and/or the like of the vehicle body 3 based on the result of detection by the inertial measurement unit 42.

The steering unit 11 enables manual steering in which the operator seated on the operator's seat 10 operates the steering wheel 30 to steer the vehicle body 3, and automatic steering in which the vehicle body 3 is steered automatically without the operator's operation.

The steering unit 11 includes the steering wheel 30, a steering shaft (rotary shaft) 31 rotatably supporting the steering wheel 30, and an assist mechanism (power steering system) 32. The assist mechanism 32 assists the steering shaft 31 and the steering wheel 30 in rotating using hydraulic pressure and/or the like. The assist mechanism 32 includes a control valve 34 which is supplied with hydraulic fluid delivered by the hydraulic pump 33, and a steering cylinder 35 actuated by the control valve 34. The control valve 34 is, for example, a three-way switching valve which achieves multi-position switching by movement of a spool or the like, and is switched in position according to the steering direction (direction of rotation) of the steering shaft 31. The steering cylinder 35 is connected to arms (knuckle arms) 36 to change the orientation of the front wheels 7F.

Upon operation (rotation) by the operator of the steering wheel 30 in a first direction or a second direction, the position and opening of the control valve 34 are changed according to the direction of rotation of the steering wheel 30, and the steering cylinder 35 extends or retracts leftward or rightward according to the position and opening of the control valve 34, thus making it possible to change the steering direction of the front wheels 7F. That is, the direction of travel of the vehicle body 3 can be changed leftward or rightward by manual steering using the steering wheel 30.

The steering unit 11 includes an automatic steering mechanism 37. The automatic steering mechanism 37 performs automatic steering of the vehicle body 3, and automatically steers the vehicle body 3 based on the position of the vehicle body 3 detected by the position detector 40. The automatic steering mechanism 37 includes a steering motor 38 and a gear mechanism 39. The steering motor 38 can be controlled in terms of the direction of rotation, speed of rotation, angle of rotation, and/or the like based on the vehicle body position. The gear mechanism 39 includes gear(s) provided on and rotate together with the steering shaft 31, and gear(s) provided on and rotate together with the rotary shaft of the steering motor 38.

The rotation of the rotary shaft of the steering motor 38 in its forward direction causes the steering shaft 31 to automatically rotate (turn) in its forward direction via the gear mechanism 39, thus making it possible to steer the front wheels 7F in one of the left and right directions. The rotation of the rotary shaft of the steering motor 38 in the reverse direction causes the steering shaft 31 to automatically rotate in the reverse direction via the gear mechanism 39, thus making it possible to steer the front wheels 7F in the other of the left and right directions.

The controller 60 includes a central processing unit (CPU), one or more memories, and/or the like. The controller 60 controls the operation of each element of the working vehicle 1. The display 45 is provided on the console 9F (FIG. 12) in front of the operator's seat 10. The display 45 displays operation information of the working vehicle 1, various other information relating to the working vehicle 1, and/or the like. The display 45 also functions as a notifier to provide notifications relating to the automatic steering of the vehicle body 3.

The switches 50 to 54 are switches (operation actuators) for automatic steering operated by the operator of the working vehicle 1. Of these, the mode switch 50 is used to issue an instruction to enter a settings mode in which settings regarding automatic steering are made. The settings mode is a mode in which various settings regarding automatic steering are made before the automatic steering is started. For example, start and end points of a reference travel line (described later) and the like can be set in the settings mode.

The defining switch 51 is used to issue an instruction to define a reference travel line based on which automatic steering is to be performed, when the settings mode is enabled. The steering switches 52 and 54 are used to issue an instruction to start or stop the automatic steering of the vehicle body 3 based on the reference travel line. The correction switch 53 is used to issue an instruction to correct the position of the vehicle body 3 detected by the position detector 40. Specifically, the position of the vehicle body 3 calculated based on satellite signal(s) (position(s) of positioning satellite(s), time of transmission, correction information, and/or the like) and measured information (acceleration, angular velocity) measured by the inertial measurement unit 42 can be corrected by operating the correction switch 53. The controller 60 detects the operation of the switches 50 to 54.

Figure 2:
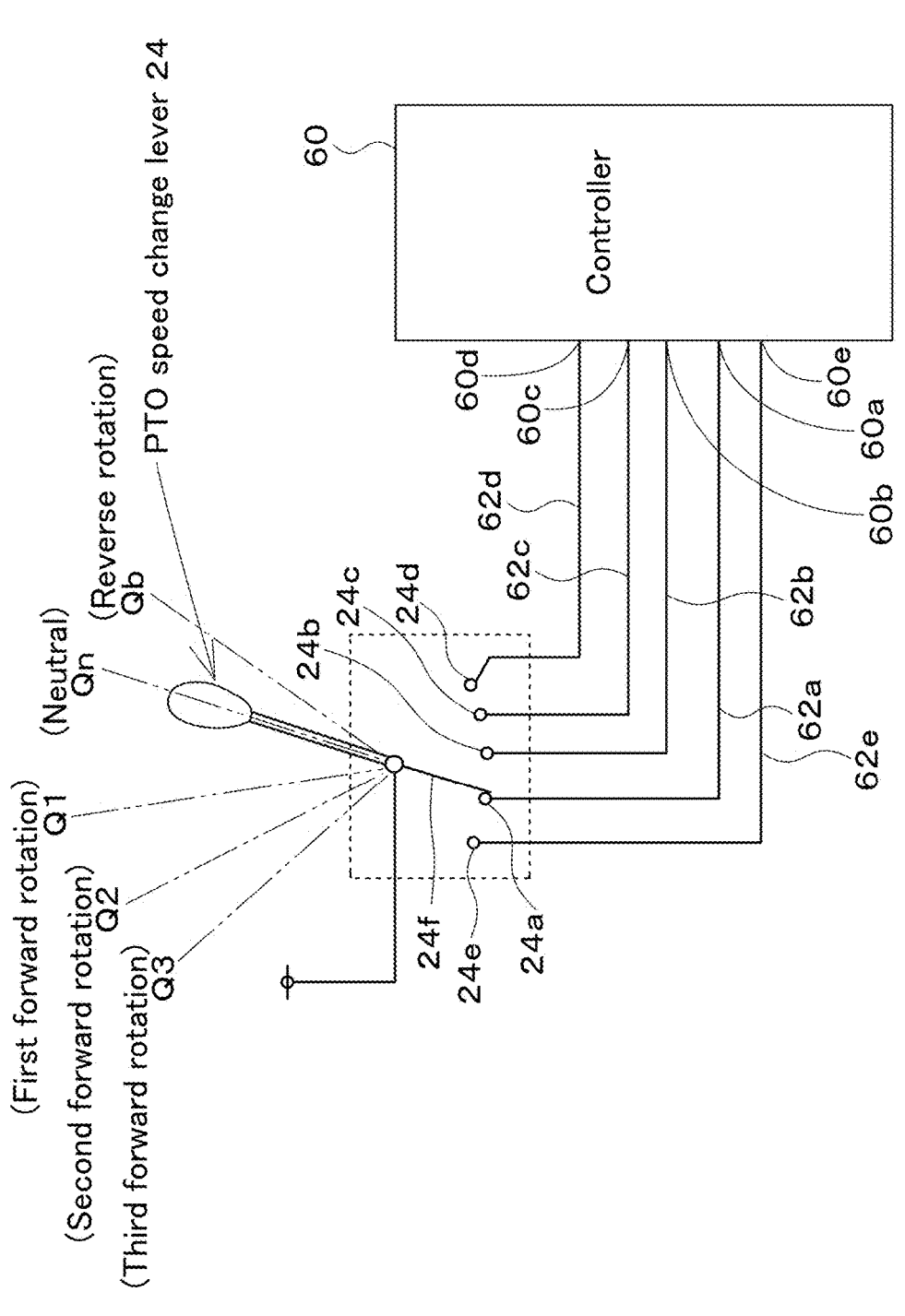
FIG. 2 illustrates details of a PTO speed change lever.

The PTO speed change lever 24 is an operation actuator for the PTO to be operated by the operator of the working vehicle 1. FIG. 2 illustrates details of the PTO speed change lever 24. The PTO speed change lever 24 is operated to change the direction of rotation of the PTO shaft 16 and to change the rotation speed of the PTO shaft 16 (change speed stages). The PTO speed change lever 24 is provided on the console 9L leftward of the operator's seat 10 such that the PTO speed change lever 24 is swingable forward and rearward (see FIGS. 12 and 7). The PTO speed change lever 24 is swung, and thus is switched from a neutral position Qn as illustrated in FIG. 2 to one of the following driving positions: a first forward rotation position Q1; a second forward rotation position Q2; a third forward rotation position Q3; or a reverse rotation position Qb.

While the PTO speed change lever 24 is not operated, the lever 24 is in the neutral position Qn in which a movable terminal 24f moving with the lever 24 is connected to a fixed terminal 24a to allow a signal to be inputted into an input port 60a of the controller 60 from a power source via the terminals 24f and 24a and an input line 62a. With this, the controller 60 detects that the PTO speed change lever 24 is in the neutral position Qn. The PTO shaft 16 here is in its stopped state.

Once the PTO speed change lever 24 has been swung in the forward direction A1 by one level and thus the position of the lever 24 has been changed to the first forward rotation position Q1, the movable terminal 24*f* is connected to a fixed terminal 24*b* to allow a signal to be inputted into an input port 60*b* of the controller 60 from the power source via the terminals 24*f* and 24*b* and an input line 62*b*. Once the PTO speed change lever 24 has been swung in the forward direction A1 by two levels and thus the position of the lever 24 has been changed to the second forward rotation position Q2, the movable terminal 24*f* is connected to a fixed terminal 24*c* to allow a signal to be inputted into an input port 60*c* of the controller 60 from the power source via the terminals 24*f* and 24*c* and an input line 62*c*. Once the PTO speed change lever 24 has been swung in the forward direction A1 by three levels and thus the position of the lever 24 has been changed to the third forward rotation position Q3, the movable terminal 24*f* is connected to a fixed terminal 24*d* to allow a signal to be inputted into an input port 60*d* of the controller 60 from the power source via the terminals 24*f* and 24*d* and an input line 62*d*.

Upon receipt of the signal at the input port 60*b*, 60*c*, or 60*d* thereof, the controller 60 detects that the PTO speed change lever 24 has been moved to the first forward rotation position Q1, the second forward rotation position Q2, or the third forward rotation position Q3. Once the PTO speed change lever 24 has been moved to the first forward rotation position Q1, the PTO shaft 16 is driven to rotate in the forward direction at a predetermined first rotation speed by the operation of the transmission 5. Once the PTO speed change lever 24 has been moved to the second forward rotation position Q2, the PTO shaft 16 is driven to rotate in the forward direction at a predetermined second rotation speed higher than the first rotation speed by the operation of the transmission 5. Once the PTO speed change lever 24 has been moved to the third forward rotation position Q3, the PTO shaft 16 is driven to rotate in the forward direction at a predetermined third rotation speed higher than the second rotation speed by the operation of the transmission 5.

Once the PTO speed change lever 24L has been swung in the rearward direction A2 and thus the position of the lever 24 has been changed to the reverse rotation position Qb, the movable terminal 24*f* is connected to a fixed terminal 24*e* to allow a signal to be inputted into an input port 60*e* of the controller 60 from the power source via the terminals 24*f* and 24*e* and an input line 62*e*. With this, the controller 60 detects that the PTO speed change lever 24 is in the reverse rotation position Qb. The PTO shaft 16 here is driven to rotate in the reverse direction at a predetermined rotation speed by the operation of the transmission 5.

Figure 3:
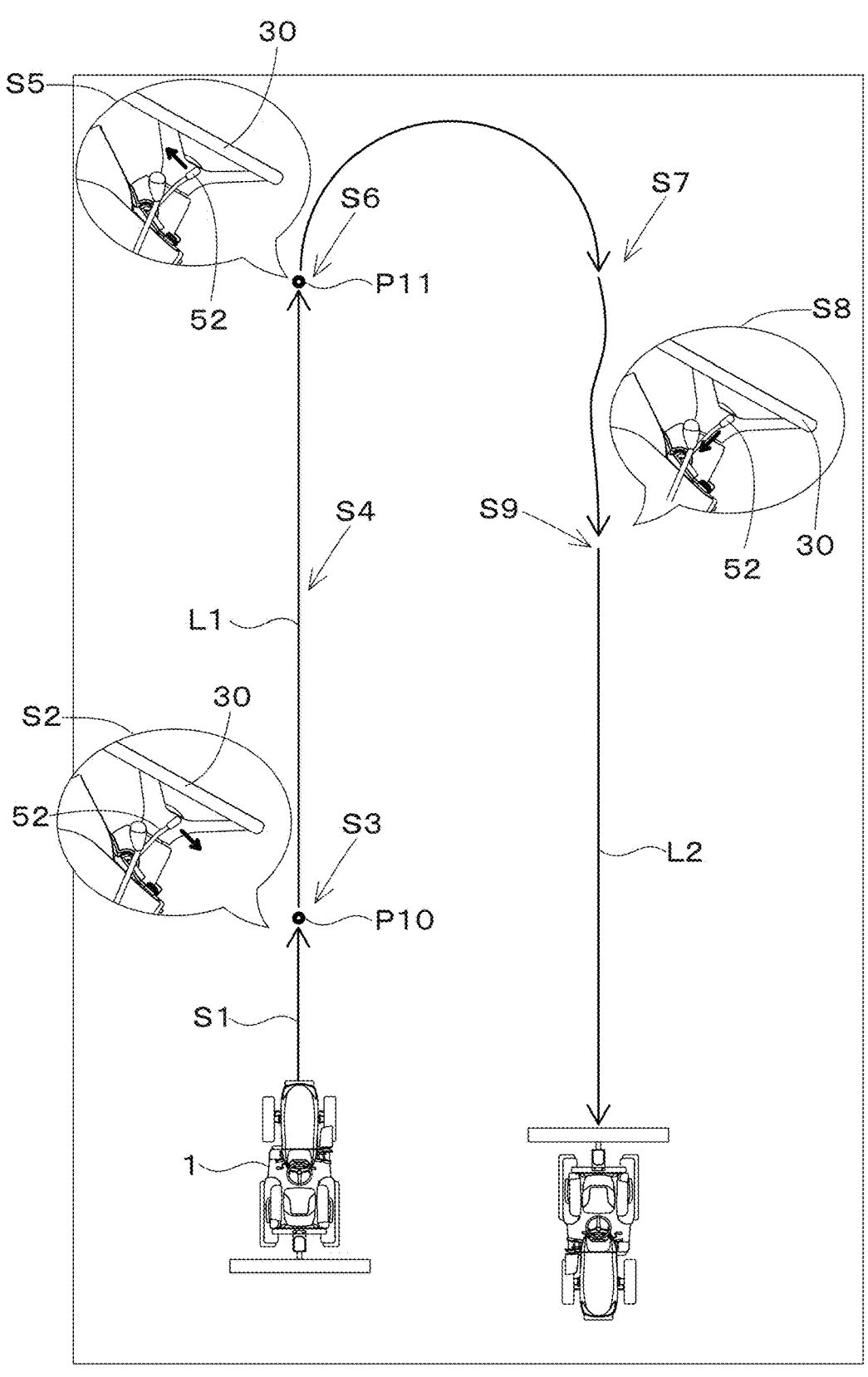
FIG. 3 is an illustration of automatic steering.

The following discusses automatic steering of the working vehicle 1. FIG. 3 is an illustration of the automatic steering of the working vehicle 1. Before the automatic steering is performed, a reference travel line L1 based on which the automatic steering is to be performed is defined first. After the reference travel line L1 is defined, planned travel line(s) L2 parallel to the reference travel line L1 is/are defined, thus making it possible to perform the automatic steering. In the automatic steering, the direction of travel of the vehicle body 3 of the working vehicle 1 is automatically controlled such that the position of the vehicle body 3 measured by the position detector 40 matches the planned travel line(s) L2.

Specifically, before the automatic steering is performed, the operator operates the working vehicle 1 to move the working vehicle 1 to a predetermined position in an agricultural field (S1), and operates the mode switch 50 at the predetermined position. This brings the controller 60 into the settings mode. Next, once the operator has operated the defining switch 51 to register a start point (S2), the controller 60 sets the position of the vehicle body 3 measured at this time by the position detector 40 as a start point P10 of the reference travel line L1 (S3).

Next, the operator manually steers the working vehicle 1 to travel from the start point P10 of the reference travel line L1 (S4), and brings the working vehicle 1 to stop at a desired position. Then, once the operator has operated the defining switch 51 to register an end point (S5), the controller 60 sets the position of the vehicle body 3 measured at this time by the position detector 40 as an end point P11 of the reference travel line L1 (S6). With this, a straight line connecting the start point P10 and the end point P11 is defined as the reference travel line L1.

Next, the operator moves the working vehicle 1 to a different area from the area in which the reference travel line L1 has been defined (S7), and operates the steering switch 52 (or the steering switch 54 (FIG. 1)) to make a start (S8). This causes the controller 60 to define a planned travel line L2 which is a straight line parallel to the reference travel line L1 (S9). Then, the controller 60 actuates the automatic steering mechanism 37 to start the automatic steering and the operator operates travel operation actuator(s) (such as an accelerator pedal 182 and/or a brake pedal 183 in FIG. 1, a shuttle lever 181 in FIG. 6, and/or the like) provided on the vehicle body 3, causing the working vehicle 1 to travel along the planned travel line L2. The reference travel line L1 and the planned travel line L2 are displayed by the display 45 and visually recognizable to the operator.

For example, if the position of the vehicle body 3 is located leftward of the planned travel line L2, the controller 60 actuates the automatic steering mechanism 37 to steer the front wheels 7F right. If the position of the vehicle body 3 is located rightward of the planned travel line L2, the controller 60 actuates the automatic steering mechanism 37 to steer the front wheels 7F left. During the automatic steering, the operator can change the travel speed (vehicle speed) of the working vehicle 1 by, for example, changing the degree of operation of the accelerator pedal 182 and/or the like and/or by changing the speed stage of the transmission 5.

After the start of the automatic steering, once the operator has operated the steering switch 52 to make a stop at a desired position, the controller 60 stops (ends) the automatic steering. Specifically, the end point of the planned travel line L2 is set upon stoppage of the automatic steering caused by the operation of the steering switch 52 to make a stop. That is, the length of the planned travel line L2 from the start point to the end point can be set, for example, to be longer than or shorter than the reference travel line L1. In other words, the planned travel line L2 is not associated with the length of the reference travel line L1, and the planned travel line L2 makes it possible to cause the working vehicle 1 to be automatically steered to travel a longer distance than the reference travel line L1.

There are cases in which, while the working vehicle 1 is automatically steered to travel, the position of the vehicle body 3 detected by the position detector 40 deviates from the actual position of the vehicle body 3. Such a deviation of the position of the vehicle body 3 can be corrected by the operator operating the correction switch 53.

Figure 4:
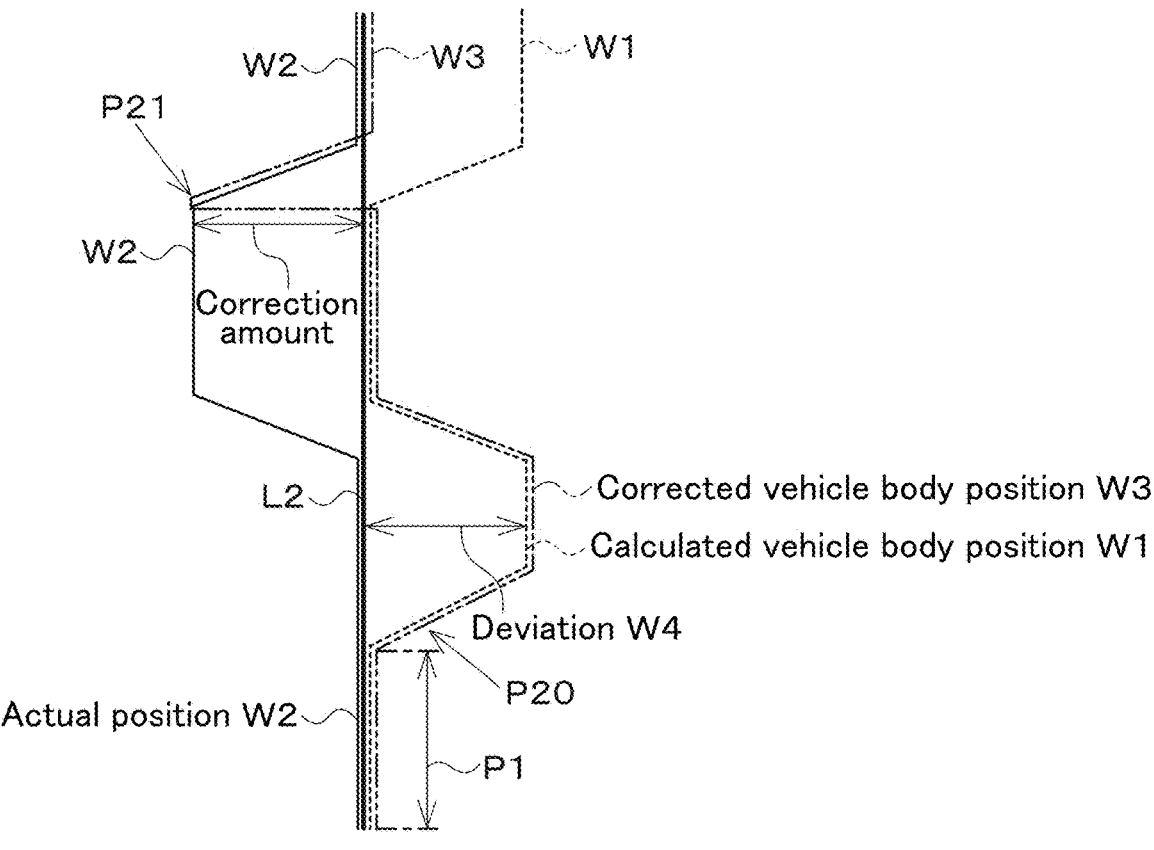
FIG. 4 illustrates how a working vehicle automatically steered behaves during straight travel.

The following discusses the relationship between the operation of the correction switch 53 and the behavior of the working vehicle 1 (path traveled by the working vehicle 1) during the automatic steering. FIG. 4 illustrates an example of the behavior of the working vehicle 1 while the working vehicle 1 is automatically steered to travel straight. In FIG. 4, for example, for a certain period of time from the start of the automatic steering of the working vehicle 1, the actual position W2 of the vehicle body 3 (actual position) matches the position W1 of the vehicle body 3 detected by the position detector 40 (calculated vehicle body position), and the actual position W2 matches the planned travel line L2. In such a case, the working vehicle 1 travels along the planned travel line L2. That is, the working vehicle 1 travels along the planned travel line L2 in a section P1 in which there are no errors in positioning performed by the position detector 40 and the calculated vehicle body position W1 matches the actual position W2.

Note that, if there are no errors in positioning by the position detector 40 and no corrections have been made, the calculated vehicle body position W1 and the vehicle body position W3 corrected by the correction switch 53 (corrected vehicle body position) have the same value. The corrected vehicle body position W3 is determined by subtracting, from the calculated vehicle body position W1, a correction amount inputted via the correction switch 53 (corrected vehicle body position W3=calculated vehicle body position W1−correction amount).

For example, assume that, at or near a position P20 in FIG. 4, an error occurs in positioning by the position detector 40 and the calculated vehicle body position W1 detected by the position detector 40 deviates rightward from the planned travel line L2 (actual position W2) due to various influences although the actual position W2 does not deviate from the planned travel line L2, and the deviation W4 is maintained. In such a case, the controller 60 determines that there is a deviation between the calculated vehicle body position W1 and the planned travel line L2, and steers the vehicle body 3 left to eliminate the deviation W4 of the calculated vehicle body position W1 from the planned travel line L2. This causes the actual position W2 of the vehicle body 3 to shift leftward away from the planned travel line L2.

After that, the operator notices that the position of the vehicle body 3 deviates leftward from the planned travel line L2, and operates the correction switch 53 at a position P21 to input a correction amount by which the calculated vehicle body position W1 is caused to approach the actual position W2. With this, the correction amount is added to the calculated vehicle body position W1, and the corrected vehicle body position W3 matches the actual position W2. That is, it is possible to correct the position of the vehicle body 3 detected by the position detector 40 in a direction that eliminates the deviation W4 occurred at or near the position P20, by inputting the correction amount using the correction switch 53.

Note that, if the actual position W2 deviates leftward from the planned travel line L2 at a point in time after the correction of the position of the vehicle body 3 (at the position P21) as illustrated in FIG. 4, the vehicle body 3 is steered right by automatic steering to cause the actual position W2 of the vehicle body 3 to move along the planned travel line L2.

It is noted that, although FIG. 3 discussed above provides a case in which automatic steering of the working vehicle 1 is performed during forward travel of the working vehicle 1, the automatic steering of the working vehicle 1 can also be performed during rearward travel of the working vehicle 1.

Figure 5:
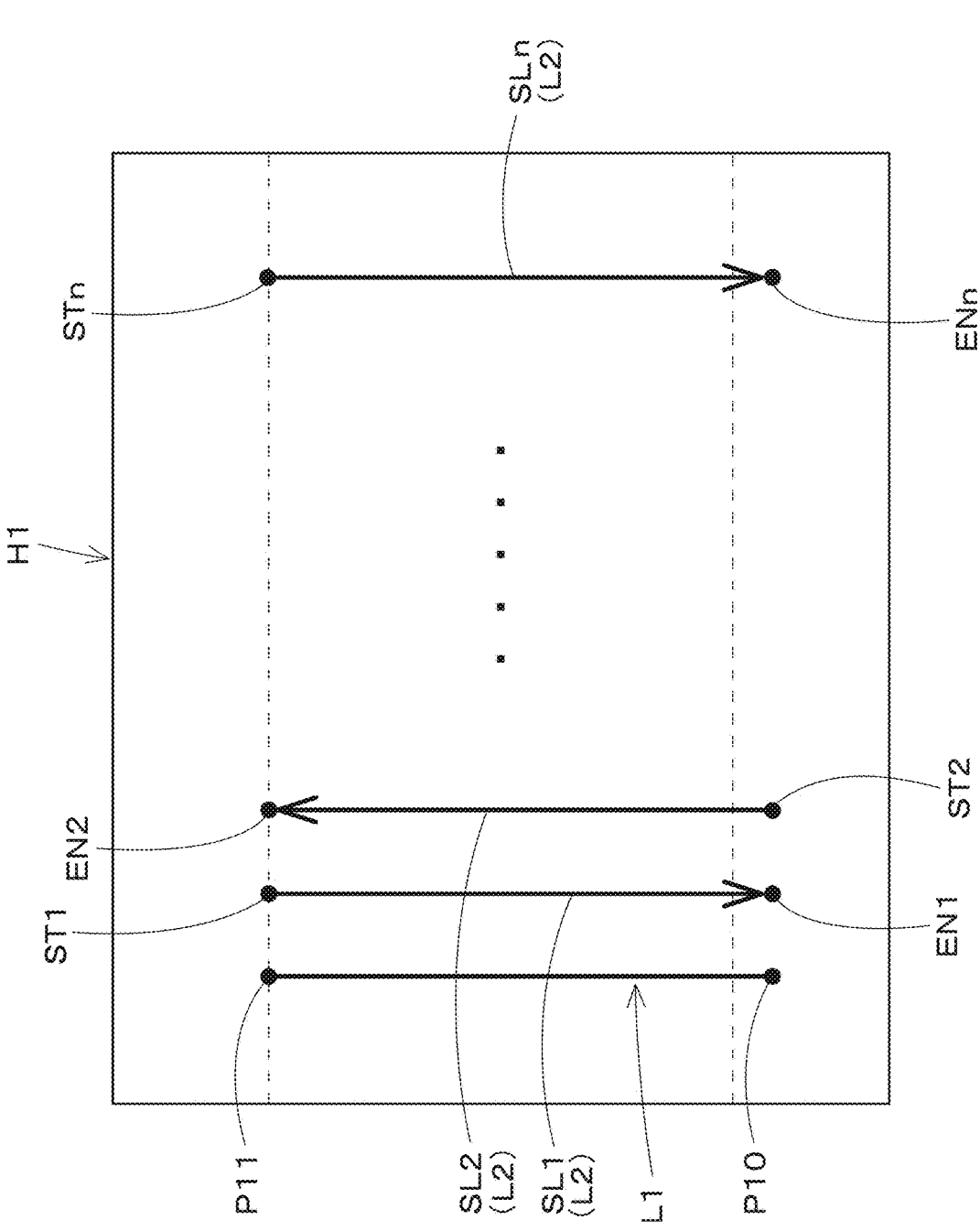
FIG. 5 illustrates how a working vehicle is automatically steered during forward travel and during rearward travel.

FIG. 5 illustrates how automatic steering is performed during forward travel and rearward travel of the working vehicle 1. For example, when automatic steering is performed in an agricultural field H1, the controller 60 defines a straight portion SLn (n=1, 2, 3 . . . ) of a planned travel line L2 parallel to the reference travel line L1 each time the steering switch 52 or 54 is operated to make a start, thus obtaining a plurality of straight portions SLn of a plurality of the planned travel lines L2. For example, when the steering switch 52 is operated to make a start at a start position ST1 to issue an instruction to start automatic steering, a first straight portion SL1 is defined. Then, the controller 60 controls the transmission 5 and the automatic steering mechanism 37 to perform automatic steering while causing the vehicle body 3 to travel along the straight portion SL1. When the steering switch 52 is operated to make a stop at an end position EN1 to issue an instruction to stop the automatic steering, the controller 60 controls the automatic steering mechanism 37 to end (stop) the automatic steering of the vehicle body 3 during forward travel along the straight portion SL1.

Then, for example, assume that, in order to do work with a working implement 2 attached to the working vehicle 1, after the automatic steering during forward travel along the first straight portion SL1, the operator is about to cause automatic steering to be performed during rearward travel of the vehicle body 3 without turning the working vehicle 1.

In such a case, for example, when the steering switch 54 is operated to make a start at a start position ST2 to issue an instruction to start automatic steering, the controller 60 defines a second straight portion SL2. Then, the controller 60 controls the transmission 5 and the automatic steering mechanism 37 to perform automatic steering while causing the vehicle body 3 to travel rearward along the straight portion SL2. Specifically, when the steering switch 54 is operated to start automatic steering, the controller 60 controls driving of the steering motor 38 of the automatic steering mechanism 37 and rotates the steering shaft 31 to steer the front wheels 7F so that the vehicle body 3 travels rearward along the straight portion SL2. Then, when the steering switch 54 is operated to make a stop at an end position EN2 to issue an instruction to stop the automatic steering, the controller 60 controls the automatic steering mechanism 37 to end the automatic steering of the vehicle body 3 during rearward travel along the straight portion SL2.

Figure 6:
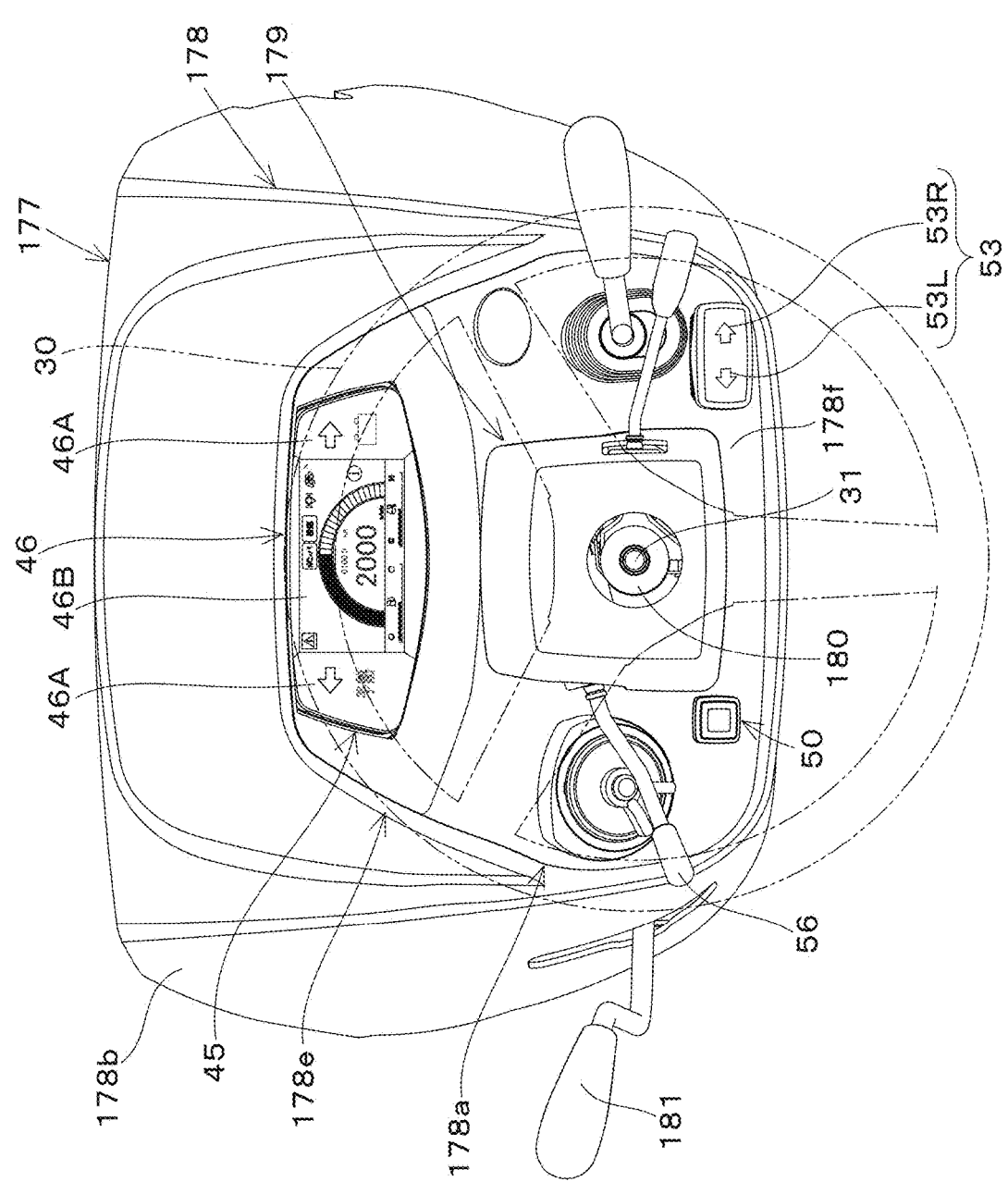
FIG. 6 illustrates a console located forward of an operator's seat.

The following discusses the console 9F. FIG. 6 illustrates the console 9F in front of the operator's seat 10 as seen from the operator's seat 10. The console 9F is provided with the steering wheel 30 and the steering shaft 31 connected to the steering wheel 30. The steering shaft 31 has its outer periphery covered by a steering post 180. The steering post 180 has its outer periphery covered by a cover 177. The cover 177 includes a panel cover 178 and a column cover 179.

The panel cover 178 supports the display 45. The panel cover 178 includes an upper plate portion 178a provided with a support portion 178e to support the display 45. The support portion 178e supports the display 45 at a position in front of the steering shaft 31 and below the steering wheel 30. The upper plate portion 178a includes a mount surface 178f which is located at a position rearward of the support portion 178e and below the steering wheel 30. The support portion 178e and the mount surface 178f are continuous with each other. The support portion 178e is located at a front portion of the upper plate portion 178a, and the mount surface 178f is located at a rear portion of the upper plate portion 178a. The mount surface 178f has thereon the mode switch 50 and the correction switch 53. The mode switch 50 and the correction switch 53 are located in the vicinity of the steering shaft 31.

The panel cover 178 includes a left plate portion 178*b* through which the shuttle lever 181 projects. The shuttle lever 181 is operated to change the direction of travel of the vehicle body 3 to the forward direction A1 or the rearward direction A2. Specifically, the operation (swinging) of the shuttle lever 181 in the forward direction A1 (upward direction in FIG. 6) causes the forward-and-rearward clutch 13 to output forward-traveling power to the traveling device 7, thus changing the direction of travel of the vehicle body 3 to the forward direction A1. The operation of the shuttle lever 181 in the rearward direction A2 (downward direction in FIG. 6) causes the forward-and-rearward clutch 13 to output rearward-traveling power to the traveling device 7, thus changing the direction of travel of the vehicle body 3 to the rearward direction A2. While the shuttle lever 181 is in the neutral position, power is not outputted to the traveling device 7.

The column cover 179 is located below the steering wheel 30 and covers an upper portion of the steering shaft 31. The column cover 179 is substantially in the form of a rectangular tube, and projects upward from the mount surface 178*f* of the panel cover 178. That is, the mount surface 178*f* is located around the column cover 179. Therefore, the mode switch 50 and the correction switch 53 attached to the mount surface 178*f* are located in the vicinity of the column cover 179.

The mode switch 50 is located diagonally leftward and downward of the steering shaft 31. The mode switch 50 is a push switch. The mode switch 50 is electrically connected to the controller 60 by an electric wire 70 (FIG. 1) routed inside the console 9F.

The correction switch 53 is located diagonally rightward and downward of the steering shaft 31. The correction switch 53 is electrically connected to the controller 60 by an electric wire 73 (FIG. 1) routed inside the console 9F. The correction switch 53 includes a left correction key 53L and a right correction key 53R which are push keys. The pressing of the left correction key 53L causes a left correction amount, by which the position of the vehicle body 3 is corrected leftward, to be inputted into the controller 60. The pressing of the right correction key 53R causes a right correction amount, by which the position of the vehicle body 3 is corrected rightward, to be inputted into the controller 60.

The left correction amount and the right correction amount can each be increased by increasing the number of times a corresponding correction key 53L or 53R is pressed. Each correction amount is determined by multiplying the number of times the corresponding correction key 53L or 53R is pressed by a predetermined unit amount (correction amount=number of times key is pressed×unit amount). That is, the correction amount increases by a unit amount (for example, several centimeters or several tens of centimeters) each time the corresponding correction key 53L or 53R is pressed. The controller 60 detects the number of times the correction switch 53 is pressed, and calculates the correction amount based on the number.

There is an automatic steering lever 56 located leftward of the steering shaft 31 such that the automatic steering lever 56 projects leftward. The automatic steering lever 56 is swingable upward, downward, forward and rearward from a neutral position about its proximal portion located near the steering shaft 31. The proximal portion of the automatic steering lever 56 is located inside the column cover 179. The column cover 179 has located therein the foregoing defining switch 51 and the steering switch 52 (FIG. 1) (details are not illustrated). The defining switch 51 and the steering switch 52 are electrically connected to the controller 60 by electric wires 71 and 72 (FIG. 1) routed inside the console 9F, respectively.

When the settings mode has been enabled by operation of the mode switch 50, the swinging of the automatic steering lever 56 from the neutral position in the rearward direction causes the defining switch 51 to be operated to register a start point, and an instruction (signal) to set the position of the vehicle body 3 detected at this time by the position detector 40 as the start point P10 of the reference travel line L1 is inputted into the controller 60. The swinging of the automatic steering lever 56 from the neutral position in the forward direction causes the defining switch 51 to be operated to register an end point, and an instruction to set the position of the vehicle body 3 detected at this time by the position detector 40 as the end point P11 of the reference travel line L1 is inputted into the controller 60.

After that, the swinging of the automatic steering lever 56 from the neutral position in the downward direction causes the steering switch 52 to be operated to make a start, and an instruction to start automatic steering is inputted into the controller 60. Furthermore, the swinging of the automatic steering lever 56 from the neutral position in the upward direction causes the steering switch 52 to be operated to make a stop, and an instruction to stop the automatic steering is inputted into the controller 60.

The mode switch 50, the correction switch 53, and the automatic steering lever 56 are located in a concentrated manner in the vicinity of the steering shaft 31. This makes it possible for the operator to know the positions of the switches 50 and 53 and the lever 56 at a glance. The operator can also operate the switches 50 and 53 and the lever 56 while remaining seated on the operator's seat 10 without having to change positions. It follows that, when automatic steering is performed during forward travel of the vehicle body 3, the switches 50, 51, 52, and 53 for automatic steering are easily operable and that accidental operation of the switches 50, 51, 52, and 53 can be prevented. The switches 50 to 53 are a first manual operator located in or on the console 9F in front of the operator's seat 10.

Note that the arrangement of the switches 50 to 53 and the lever 56 is not limited to the foregoing arrangement, and may be any arrangement. The defining switch 51 and the steering switch 52 may be configured such that they can be operated using respective individual control knobs such as lever(s), button(s), and/or the like.

Figure 7:
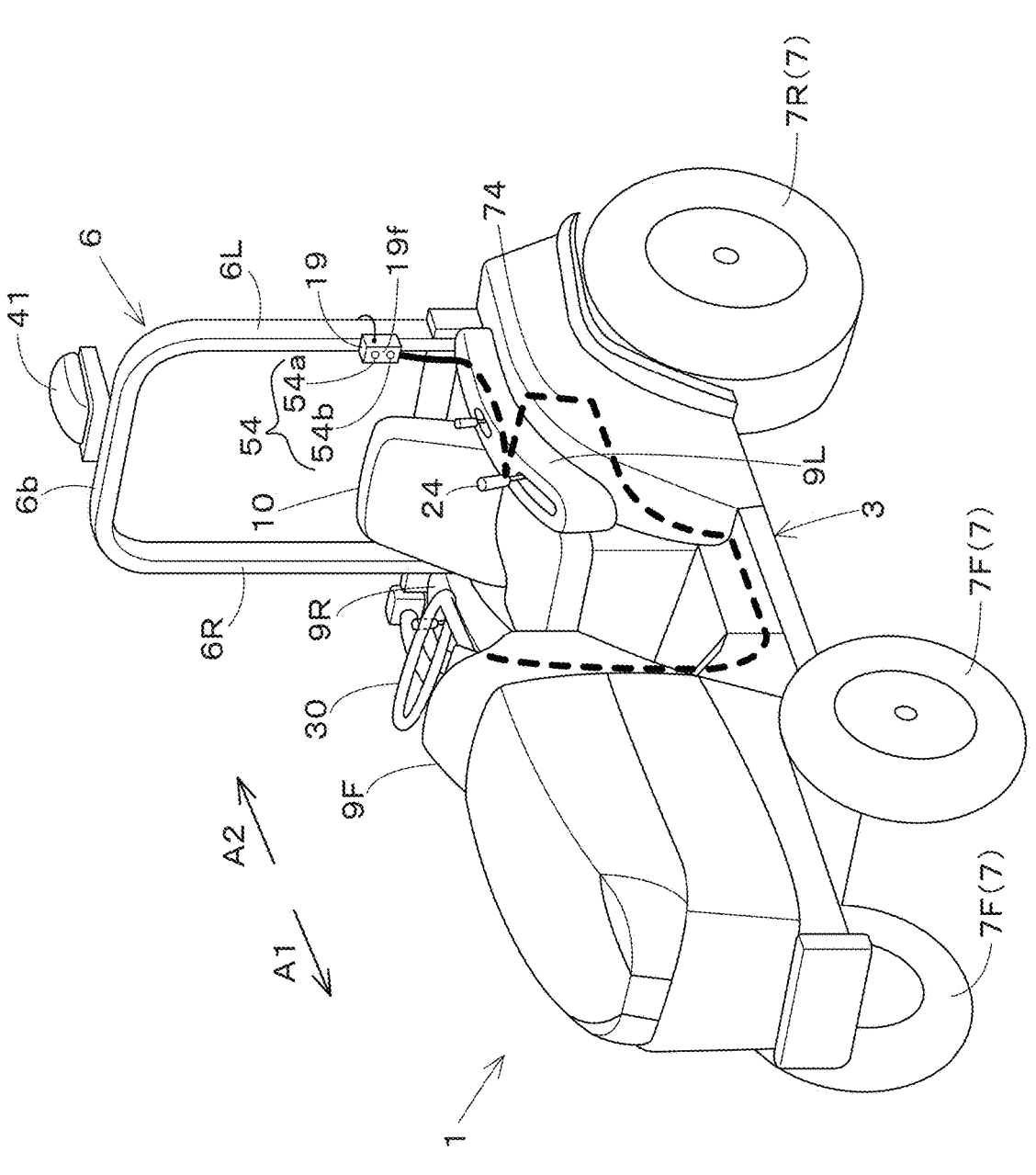
FIG. 7 is a perspective view of a working vehicle.

FIG. 7 is a front perspective view of the working vehicle 1. The console 9L located leftward of the operator's seat 10 is provided with the foregoing PTO speed change lever 24 to operate the PTO shaft 16. The ROPS 6 is located rearward of the operator's seat 10 (downstream of the operator's seat 10 in the rearward direction A2). The ROPS 6 includes a pair of left and right pillars 6L and 6R and a beam 6*b*. The pillars 6L and 6R and the beam 6*b* are made of steel. The pillar 6L extends upward from a left rear portion of the vehicle body 3, and the pillar 6R extends upward from a right rear portion of the vehicle body 3. The beam 6*b* connects upper ends of the pillars 6L and 6R.

The left pillar 6L has a switch box 19 attached to its front surface. The switch box 19 has a magnet (not illustrated) fixed to its mount surface 19*b* (back surface of the switch box 19 facing in the rearward direction A2 in FIG. 7, illustrated in FIG. 8 discussed later) which contacts the pillar 6L. The switch box 19 is attachable to and detachable from the pillar 6L using the magnetic force of the magnet.

There is the steering switch 54 located on a front surface 19*f* facing in the forward direction A1 that is one of the surfaces of the switch box 19 other than the mount surface 19*b*. The steering switch 54 is a second manual operator for automatic steering attachable and detachable at a location rearward of the operator's seat 10, and has the same functions as the steering switch 52 included in the first manual operator located in/on the console 9F.

The steering switch 54 includes an ON key 54*a* and an OFF key 54*b*. The switch box 19 includes therein contact(s) of the steering switch 54, electric wire(s), and/or the like. The switch box 19 is a housing of the second manual operator. The steering switch 54 is electrically connected to the controller 60 by an electric wire 74 (see also FIG. 1) routed from the switch box 19 located rearward of the operator's seat 10 to the console 9F through the interior of a left portion of the vehicle body 3.

Pressing of the ON key 54*a* causes the steering switch 54 to be operated to make a start, and an instruction to start automatic steering is inputted into the controller 60. Pressing of the OFF key 54*b* causes the steering switch 54 to be operated to make a stop, and an instruction to stop the automatic steering is inputted into the controller 60.

When automatic steering is performed during rearward travel of the working vehicle 1, the operator seated on the operator's seat 10 looks back (looks in the rearward direction A2) to ensure safety behind the working vehicle 1 (area downstream of the working vehicle 1 in the rearward direction A2). The operator looking back can visually recognize the ON key 54*a* and the OFF key 54*b*. Therefore, the operator presses the ON key 54*a* to start automatic steering during rearward travel, and presses the OFF key 54*b* to stop the automatic steering during the rearward travel. That is, the steering switch 54 is a manual operator for automatic steering for rearward travel that is to be operated to start and stop automatic steering during rearward travel of the vehicle body 3.

Note, however, that the steering switches 52 and 54 can be used (enabled) during forward travel of the vehicle body 3 and rearward travel of the vehicle body 3. That is, during forward travel of the vehicle body 3 and during rearward travel of the vehicle body 3, the operation of one of the steering switches 52 and 54 to make a start or make a stop causes the controller 60 to start or stop automatic steering. Note, however, that, once the controller 60 has started automatic steering in response to the operation of one of the steering switches 52 and 54 to make a start, the controller 60 disables the other of the steering switches 52 and 54 until stopping (ending) the automatic steering in response to the operation of the one of the steering switches 52 and 54 to make a stop.

Specifically, for example, once the controller 60 has started automatic steering during rearward travel in response to the operation of the steering switch 54 (which is located downward in the rearward direction A2) to make a start, the controller 60 disables the steering switch 52, i.e., does not accept the operation of the steering switch 52, until stopping the automatic steering in response to the operation of the steering switch 54 to make a stop. For example, once the controller 60 has started automatic steering during forward travel in response to the operation of the steering switch 52 (which is located downward in the forward direction A1) to make a start, the controller 60 disables the steering switch 54, i.e., does not accept the operation of the steering switch 54, until stopping the automatic steering in response to the operation of the steering switch 52 to make a stop.

Figure 8:
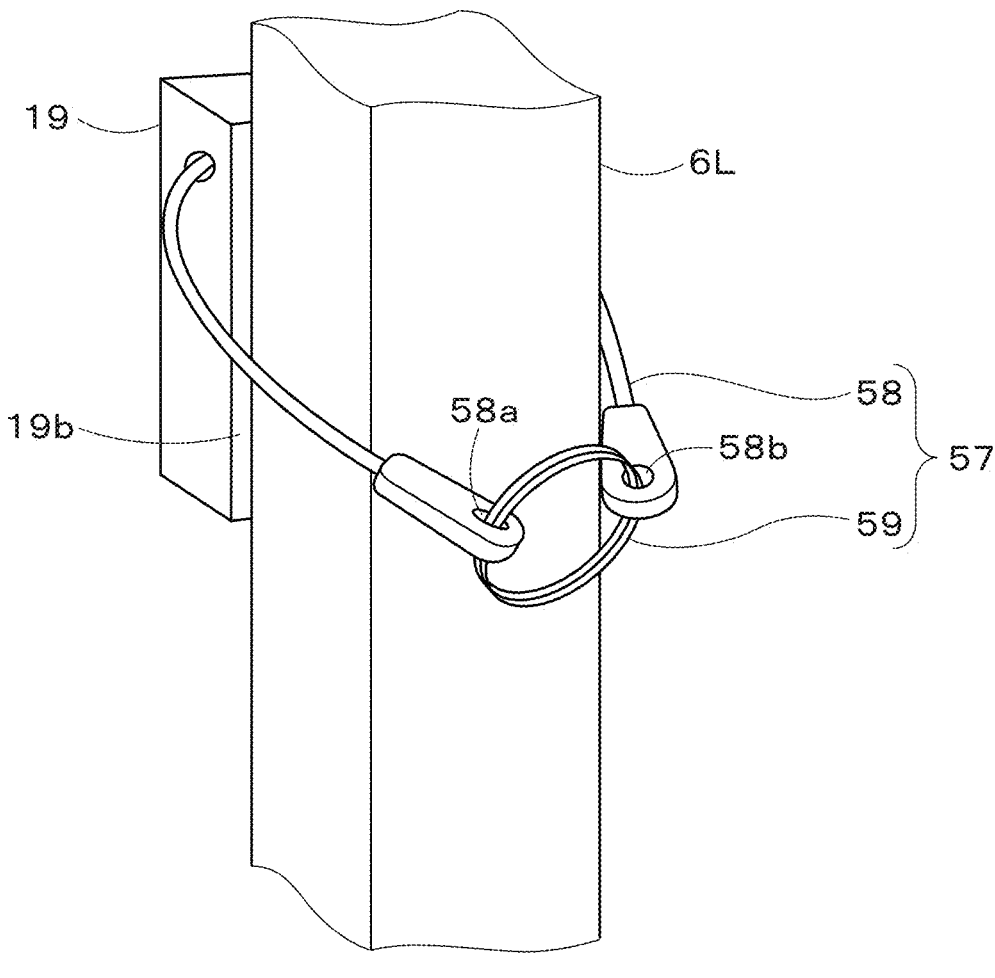
FIG. 8 is a perspective view of a second manual operator and its surroundings.

FIG. 8 is a rear perspective view of the switch box 19 and the pillar 6L. The switch box 19 provided with the steering switch 54 is prevented from falling out of the pillar 6L with a falling preventer 57. The falling preventer 57 includes a wire 58 and a snap ring 59. The wire 58 passes sideways through an upper portion of the switch box 19 and surrounds the pillar 6L. The opposite ends of the wire 58 located rearward of the pillar 6L have through holes 58*a* and 58*b*, respectively. The snap ring 59 is located rearward of the pillar 6L and passes through the through holes 58*a* and 58*b* of the wire 58. Thus, the wire 58 and the snap ring 59 restrict the switch box 19 from separating from the vicinity of the pillar 6L.

In FIGS. 7 and 8, the switch box 19 with the steering switch 54 is attached to the front surface of the left pillar 6L of the ROPS 6. Note, however, that the switch box 19 can also be attached to the right pillar 6R. Since the electric wire 74 for the switch box 19 is drawn out (upward) of the vehicle body 3 at a location rearward of the operator's seat 10 as illustrated in FIG. 7, the electric wire 74 does not hinder the operation or work. Furthermore, since the electric wire 74 from the rear of the operator's seat 10 is long enough to be attached to the pillar 6L or 6R, it is easy to detach the switch box 19 from one of the pillars 6L and 6R and attach it to the other and vice versa. The switch box 19 can also be attached to any surface of the pillar 6L or 6R, can be attached to any surface of the beam 6*b*, and can be attached to any position on the vehicle body 3. Note that, in consideration of the ease of operation of the steering switch 54, it is not recommended that the switch box 19 be attached to the beam 6*b* (FIG. 7) located higher than the operator seated on the operator's seat 10.

Figure 9:
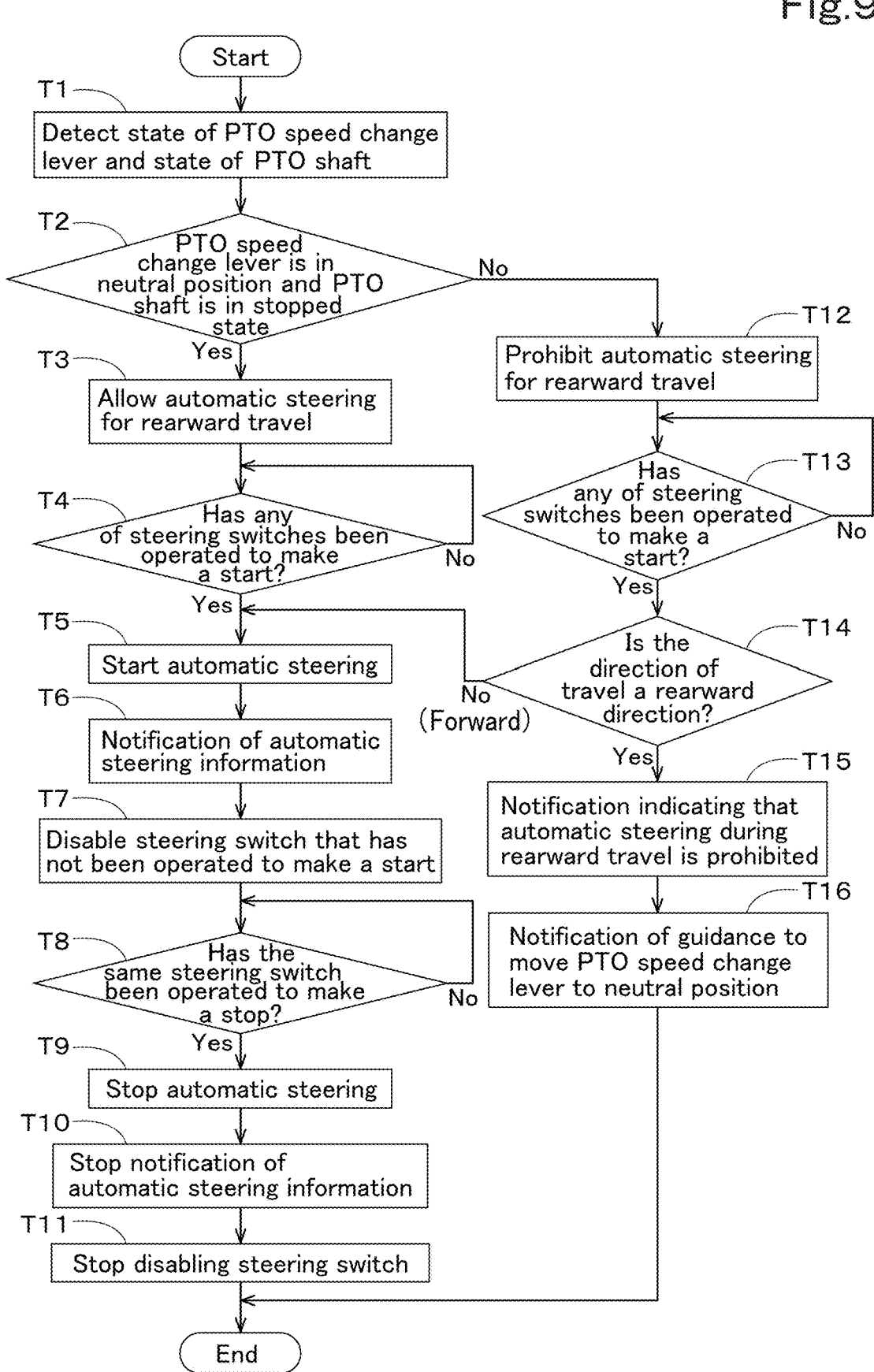
FIG. 9 is a flowchart showing how a working vehicle operates.

The following discusses control of automatic steering linked to the PTO shaft 16 of the working vehicle 1. FIG. 9 is a flowchart showing the operation of the working vehicle 1. The steps in FIG. 9 are performed by the controller 60 in accordance with prestored software program(s).

First, the controller 60 detects the state of the PTO speed change lever 24 and the PTO shaft 16 (T1). The state of the PTO shaft 16 is detected based on, for example, the opening of the actuation valve 27. Alternatively, a sensor to detect the rotating state of the PTO shaft 16 may be provided and the controller 60 may detect the state of the PTO shaft 16 based on a signal from the sensor.

If the PTO speed change lever 24 is in the neutral position Qn and the PTO shaft 16 is in the stopped state (YES in T2), the controller 60 allows automatic steering for rearward travel (T3). Note that automatic steering for forward travel is always allowed. Next, after the mode switch 50 and/or the defining switch 51 is/are operated to define a reference travel line L1, once the steering switch 52 or 54 has been operated to make a start (YES in T4), the controller 60 controls the automatic steering mechanism 37 to start automatic steering (T5). With this, automatic steering during forward travel or automatic steering during rearward travel of the working vehicle 1 is performed depending on the direction of travel of the vehicle body 3.

The controller 60 notifies the operator of the working vehicle 1 of automatic steering information indicative of the state of the automatic steering being performed, guidance relating to the automatic steering, and/or the like by causing the display 45 to display the automatic steering information (T6). It is noted here that the display 45 may be caused to display, for example, a reference travel line L1 and/or planned travel line(s) L2 for the working vehicle 1 in the agricultural field H1, the position of the working vehicle 1, and/or the like as illustrated in FIG. 5. Alternatively, an audio or visual notification of the state of the automatic steering and guidance relating to the automatic steering may be provided using a beeper (buzzer), a speaker, lighting, and/or the like of the working vehicle 1.

The controller 60 disables the steering switch that has not been operated to make a start (T7). With this, for example, even if the steering switch that has not been operated to make a start is operated accidentally, the automatic steering is not stopped or restarted in response to the operation.

After that, when the same steering switch as the switch whose operation to make a state was detected in step T4 is operated to make a stop (YES in T8), the controller 60 controls the automatic steering mechanism 37 to stop the automatic steering (T9). The controller 60 also stops the notification of the automatic steering information performed by the display 45 (T10), and stops disabling the steering switch that has not been operated (T11).

In contrast, if the PTO speed change lever 24 is not in the neutral position Qn or the PTO shaft 16 is in its driven state (NO in T2), the controller 60 prohibits the automatic steering for rearward travel (T12). It is noted here that the automatic steering for forward travel is not prohibited.

Next, once the steering switch 52 or 54 has been operated to make a start (YES in T13), the controller 60 detects the direction of travel of the vehicle body 3 based on the operating state of the shuttle lever 181 (FIG. 6), the rotating state of the wheels 7F and/or 7R, and/or the like. Note that sensor(s) to detect the operating state of the shuttle lever 181, the rotating state of the wheels 7F and/or 7R, and/or the like may be provided. If the direction of travel of the vehicle body 3 is the forward direction A1 (NO in T14), the controller 60 controls the automatic steering mechanism 37 to start the automatic steering during forward travel (T5). The controller 60 then performs step T6 and the subsequent steps.

If the direction of travel of the vehicle body 3 is the rearward direction A2 (YES in T14), the controller 60 does not start the automatic steering during rearward travel and provides, to the operator, a notification including, for example, a message indicating that the automatic steering during rearward travel is prohibited, by causing the display 45 to display the message (T15). The controller 60 also provides, to the operator, a notification including guidance to prompt the operator to move the PTO speed change lever 24 to the neutral position Qn, by causing the display 45 to display the guidance (T16).

The notifications provided via the display 45 in steps T15 and T16 may be continued until the PTO speed change lever 24 is moved to the neutral position Qn and the PTO shaft 16 is brought into the stopped state, or may be performed for a certain period of time, for example. Alternatively or additionally, an audio or visual notification including an indication that the automatic steering during rearward travel is prohibited, the guidance to prompt the operator to move the PTO speed change lever 24 to the neutral position Qn, and/or the like may be provided in steps T15 and T16 using a beeper (buzzer), a speaker, lighting, and/or the like of the working vehicle 1. That is, a notifier to provide a visual, audio, and/or tactile notification other than the display 45 may be used. Furthermore, for example, a notification including guidance to prompt the operator to stop the PTO shaft 16 may be provided instead of step T16.

In the foregoing preferred embodiment, the controller 60 prohibits the automatic steering during rearward travel if the PTO speed change lever 24 is not in the neutral position Qn or if the PTO shaft 16 is in the driven state (NO in T2 in FIG. 9). Note, however, that the controller 60 may prohibit the automatic steering during rearward travel based on whether or not either one of those conditions regarding the PTO speed change lever 24 and the PTO shaft 16 is satisfied.

In the foregoing preferred embodiment, if the steering switch 52 or 54 is operated to issue an instruction to start automatic steering and the vehicle body 3 travels rearward (YES in step T13 in FIG. 9, YES in step T14 in FIG. 9), the display 45 is caused to provide a notification indicating that the automatic steering during rearward travel is prohibited and a notification including guidance for moving the PTO speed change lever 24 (steps T15 and T16). However, also if the steering switch 52 or 54 is operated to issue an instruction to start automatic steering and the vehicle body 3 travels forward (YES in step T13, NO in step T14), the display 45 may be caused to provide a notification indicating that the automatic steering during rearward travel is prohibited and a notification including guidance for moving the PTO speed change lever 24. Note that, in such a case, it is preferable that the display 45 and/or the like be caused to provide a notification including guidance to prompt the operator to move the PTO speed change lever 24 to the neutral position Qn when the automatic steering is performed during rearward travel.

In the foregoing preferred embodiment, the PTO speed change lever 24 is provided as an operation actuator to control driving of the PTO shaft 16. Note, however, that, for example, the PTO switch 23 as illustrated in FIG. 10 may be provided in addition to the lever 24 to improve safety and/or the like.

Figure 10:
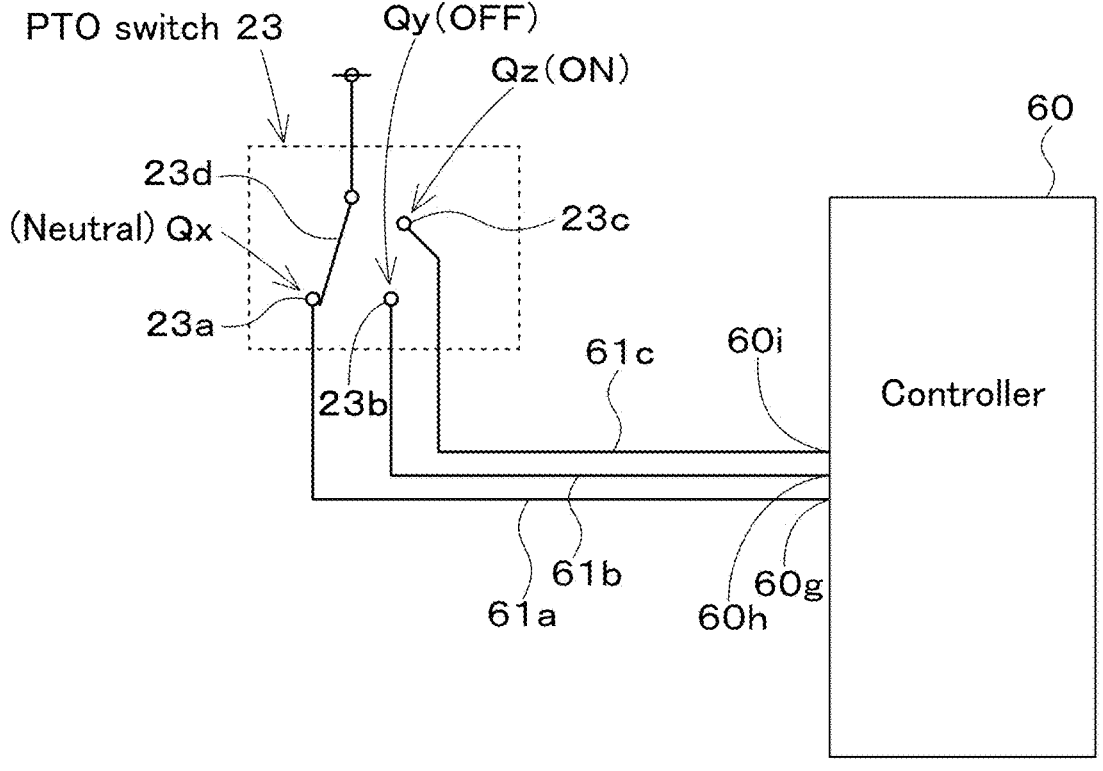
FIG. 10 illustrates details of a PTO switch.

FIG. 10 illustrates details the PTO switch 23. The PTO switch 23 is operated to issue an instruction to drive or stop the PTO shaft 16. The PTO switch 23 is, for example, provided on the console 9L located leftward of the operator's seat 10 such that the PTO switch 23 is operable. The PTO switch 23 is movable from its neutral position Qx to its OFF position Qy or ON position (driving position) Qz.

When the PTO switch 23 has not been operated, the PTO switch 23 is in the neutral position Qx in which a movable terminal 23d of the switch 23 is connected to a fixed terminal 23a to allow a signal to be inputted into an input port 60g of the controller 60 from the switch 23 via an input line 61a. With this, the controller 60 detects that the PTO switch 23 is in the neutral position Qx. The PTO shaft 16 is in its stopped state, and even if, for example, the PTO speed change lever 24 (FIG. 2) is moved to the driving position Q1, Q2, Q3, or Qb, the PTO shaft 16 is not driven to rotate.

Once the PTO switch 23 has been operated to move to the ON position Qz, the movable terminal 23g is connected to a fixed terminal 23c to allow a signal to be inputted into an input port 60i of the controller 60 from the switch 23 via an input line 61c. With this, the controller 60 detects that the PTO switch 23 has been moved to the ON position Qz. The PTO shaft 16 here can be driven by the operation of the transmission 5. That is, the movement of the PTO speed change lever 24 to the driving position Q1, Q2, Q3, or Qb causes the PTO shaft 16 to be driven to rotate at a predetermined rotation speed in the forward direction or reverse direction.

Once the PTO switch 23 has been operated to move to the OFF position Qy, the movable terminal 23g is connected to a fixed terminal 23b to allow a signal to be inputted into an input port 60h of the controller 60 from the switch 23 via an input line 61b. With this, the controller 60 detects that the PTO switch 23 has been moved to the OFF position Qy. The PTO shaft 16 here is brought into its stopped state by the operation of the transmission 5.

As discussed above, the operation of the PTO switch 23 also makes it possible to drive or stop the PTO shaft 16.

Therefore, the automatic steering during rearward travel may be allowed or prohibited based on the position of the PTO switch 23 instead of the position of the PTO speed change lever 24. Specifically, for example, in step T1 in FIG. 9, the state of the PTO switch 23 may be detected instead of the PTO speed change lever 24, and in step T2 in FIG. 9, whether the PTO switch 23 is in the neutral position Qx or not may be determined. The PTO speed change lever 24 may be, for example, a shift lever or a select lever swingable forward and rearward and leftward and rightward or the like.

Figure 11:
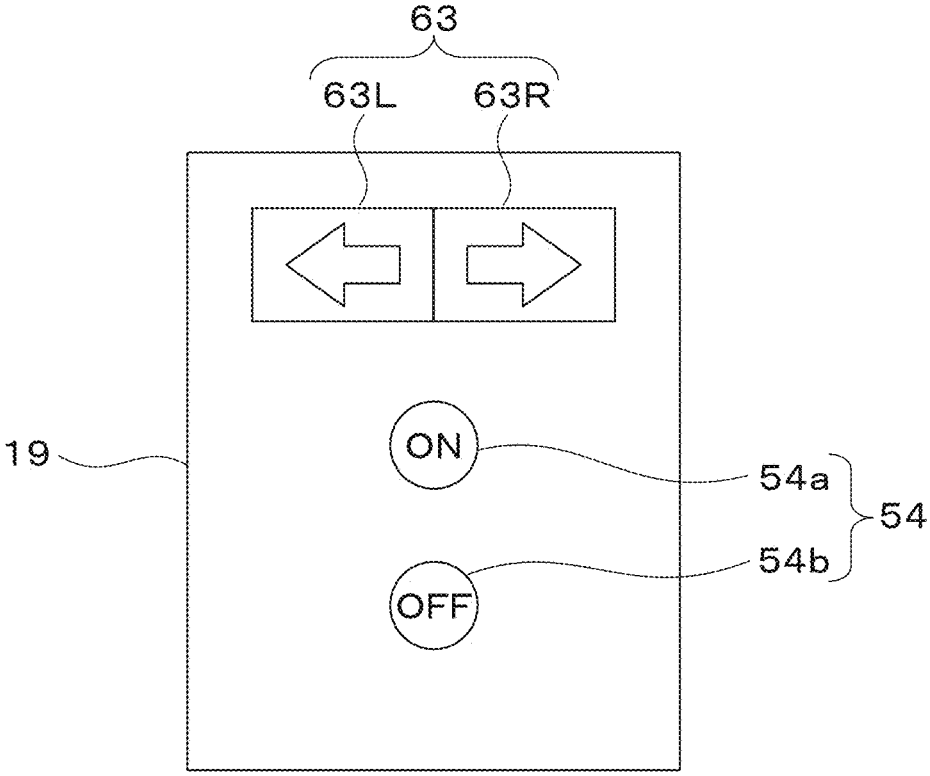
FIG. 11 illustrates another example of the second manual operator.

In the foregoing preferred embodiment, the switch box 19 (FIG. 7) attachable at a location rearward of the operator's seat 10 (location downstream of the operator's seat 10 in the rearward direction A2) is provided with the steering switch 54 as a manual operator for automatic steering. Note, however, that this does not imply any limitation. For example, as illustrated in FIG. 11, the switch box 19 may be provided with a correction switch 63 as a manual operator for automatic steering. The correction switch 63 has the same functions as the correction switch 53 (FIG. 6) provided on the console 9F. The functions of a left correction key 63L and a right correction key 63R of the correction switch 63 are the same as those of the left correction key 53L and the right correction key 53R of the correction switch 53. Such a configuration make it possible, during automatic steering during rearward travel of the vehicle body 3, for the operator to operate the correction key(s) 63L and/or 63R to correct the position of the vehicle body 3 detected by the position detector 40 while looking back (while facing in the rearward direction A2). During automatic steering, the controller 60 may, once one of the correction switches 53 and 63 has been operated, disable the other of the correction switches 53 and 63 until the automatic steering ends.

Other manual operator(s) for automatic steering such as the mode switch 50 and/or the defining switch 51 may be provided on at least one of the consoles 9F, 9L, and 9R located forward of the operator's seat 10 (located downstream of the operator's seat 10 in the forward direction A1) and on opposite sides of the operator's seat 10, and on the switch box 19 attachable at a location rearward of the operator's seat 10 (attachable at a location downstream of the operator's seat 10 in the rearward direction A2). The manual operator(s) for automatic steering is/are not limited to push switch(es), and may be switch(es) of different types such as slide switch(es) and/or tumbler switch(es), key(s) and/or lever(s) other than switches, and/or the like.

A working vehicle 1 according to one or more preferred embodiments achieves the following effects.

A working vehicle 1 according to one or more preferred embodiments includes a vehicle body 3 to be manually steered with a steering wheel 30 or automatically steered to travel forward or rearward, an operator's seat 10 on the vehicle body 3, a console 9F, 9L, 9R located forward of the operator's seat 10 or located on one side of the operator's seat 10, a first manual operator 50, 51, 52, 53 for automatic steering provided in or on the console 9F, and a second manual operator 54, 63 for automatic steering attachable at a location rearward of the operator's seat 10.

The above configuration makes it possible, when automatic steering is performed during forward travel of the vehicle body 3 of the working vehicle 1, to operate the first manual operator 50, 51, 52, 53 for automatic steering located forward of the operator's seat 10 or the like and, when automatic steering is performed during rearward travel of the vehicle body 3, to operate the second manual operator 54, 63 for automatic steering located rearward of the operator's seat 10. This eliminates the need for the operator to move the manual operator 50, 51, 52, 53, 54, 63 for automatic steering according to the direction of travel of the vehicle body 3 when performing the automatic steering, making it possible to reduce complexity of operation.

In one or more preferred embodiments, the first manual operator 50, 51, 52, 53 and the second manual operator 54, 63 may include respective steering switches 52, 54 to be operated to issue an instruction to start or stop the automatic steering. With this, the steering switch 52 located forward of the operator's seat 10 is operated to start or stop automatic steering when automatic steering is performed during forward travel of the vehicle body 3, whereas the steering switch 54 located rearward of the operator's seat 10 is operated to start or stop automatic steering when automatic steering is performed during rearward travel of the vehicle body 3, thus improving ease of operation.

In one or more preferred embodiments, the working vehicle 1 may further include a position detector 40 to detect a position of the vehicle body 3. The first manual operator 50, 51, 52, 53 may include a defining switch 51 to be operated to issue an instruction to define a reference travel line L1 based on which the automatic steering is performed, and a correction switch 53 to be operated to issue an instruction to correct the position of the vehicle body 3 detected by the position detector 40, or the first manual operator 50, 51, 52, 53 and the second manual operator 54, 63 may include respective defining switches 51 to be operated to issue an instruction to define a reference travel line L1 based on which the automatic steering is performed, and respective correction switches 53, 63 to be operated to issue an instruction to correct the position of the vehicle body 3 detected by the position detector 40. This makes it possible to define a reference travel line L1 by operating the defining switch 51 and then perform automatic steering by operating the steering switch 52 or 54 according to the direction of travel of the vehicle body 3. It is also possible to operate the correction switch 53 during automatic steering to correct the position of the vehicle body 3 detected by the position detector 40 to appropriately perform the automatic steering.

In the preferred embodiment as illustrated in FIG. 11, the second manual operator 54, 63 may include a correction switch 63 to be operated to issue an instruction to correct the position of the vehicle body 3 detected by the position detector 40. This makes it possible to correct the position of the vehicle body 3 detected by the position detector 40 by operating the correction switch 53 or 63 corresponding to the direction of travel of the vehicle body 3 to appropriately perform automatic steering, and possible to further reduce complexity of the operator's operation.

In one or more preferred embodiments, the working vehicle 1 may further include a controller 60 to control the automatic steering. The controller 60 may be configured or programmed to define, upon operation of the defining switch 51 or one of the defining switches 51 at a start and end of travel of the vehicle body 3 in which the vehicle body 3 is manually steered, the reference travel line L1 based on positions of the vehicle body 3 detected by the position detector 40, start the automatic steering upon operation of one of the steering switches 52, 54 to start the automatic steering, stop the automatic steering upon operation of one of the steering switches 52, 54 to stop the automatic steering, correct a position of the vehicle body 3 upon operation of the correction switch 53, 63 or one of the correction switches 53, 63, and upon operation of one of the respective switches (steering switches 52 and 54 or correction switches 53 and 63) of the first manual operator 50, 51, 52, 53 and the second manual operator 54, 63 having the same function, disable the other of the switches until the automatic steering ends.

This makes it possible to appropriately perform automatic steering during forward or rearward travel of the vehicle body 3. It is also possible to eliminate or reduce the likelihood that, when one of the steering switches 52 and 54 having the same function is operated to start automatic steering or when one of the correction switches 53 and 63 having the same function is operated to correct the position of the vehicle body 3, the other of the switches will be accidentally operated to stop automatic steering or correct the position of the vehicle body 3 without the operator's intention, making it possible to ensure safety.

In one or more preferred embodiments, the second manual operator 54 may be electrically connected to the controller 60 by an electric wire 74 routed from the location rearward of the operator's seat 10 to the console 9F through a side portion of the vehicle body 3. This allows an input signal corresponding to the operation of the second manual operator 54 to be transmitted from the second manual operator 54 via the electric wire 74 to the controller 60, making it possible to perform automatic steering according to the operation of the second manual operator 54.

In one or more preferred embodiments, the working vehicle 1 may further include a protection structure 6 to protect the operator's seat 10. The second manual operator 54, 63 may be attachable to and detachable from the protection structure 6. This allows the operator to attach the second manual operator 54, 63 to a desired position on the protection structure 6, making it possible to improve ease of operation of the second manual operator 54, 63.

In one or more preferred embodiments, the protection structure 6 may include pillars 6L and 6R extending upward from a left rear portion and a right rear portion of the vehicle body 3, respectively, and a beam 6b connecting upper ends of the pillars 6L and 6R. The second manual operator 54, 63 may include a housing (switch box) 19 attachable to and detachable from any of the pillars 6L and 6R, and an operable key 54a, 54a, 63L, 63R provided on a surface (front surface) 19f of the housing 19 other than a mount surface 19b for contact with the pillar 6L.

This makes it possible to eliminate or reduce the likelihood that, when the operator looks back (looks in the rearward direction A2) to ensure safety when performing automatic steering during rearward travel of the vehicle body 3, the field of vision of the operator will be narrowed by the protection structure 6 and/or the second manual operator 54, 63. It is also possible for the operator looking back (looking in the rearward direction A2) to visually recognize the key(s) 54a, 54b, 63L, 63R of the second manual operator 54, 63 while ensuring safety behind the working vehicle 1 (area downstream of the working vehicle 1 in the rearward direction A2), making it possible to improve ease of operation of the key 54a, 54b, 63L, 63R.

In one or more preferred embodiments, the working vehicle 1 may further include a falling preventer 57 to prevent the second manual operator 54 from falling out of the protection structure 6. This makes it possible to eliminate or reduce the likelihood that the second manual operator 54 will come off the protection structure 6 due to vibrations from the working vehicle 1 and be damaged or lost.

A working vehicle 1 according to one or more preferred embodiments includes a vehicle body 3 to be manually steered with a steering wheel 30 or automatically steered to travel forward or rearward, a prime mover 4 on the vehicle body 3, a working implement 2 supported on the vehicle body 3, a power take-off (PTO) 16 shaft to transmit power from the prime mover 4 to the working implement 2, and a controller 60 to control automatic steering of the vehicle body 3 and driving of the PTO shaft 16, wherein the controller 60 is configured or programmed to allow the automatic steering during rearward travel of the vehicle body 3 when the PTO shaft 16 is in a stopped state, and prohibit the automatic steering during rearward travel of the vehicle body 3 when the PTO shaft 16 is in a driven state.

With the above configuration of the working vehicle 1, automatic steering during rearward travel is performed while the PTO shaft 16 is in the stopped state, whereas the automatic steering during rearward travel is not performed while the PTO shaft 16 is in the driven state. This makes it possible to stably and safely perform automatic steering during rearward travel.

In one or more preferred embodiments, the working vehicle 1 may further include a PTO operation actuator 24, 23 (PTO speed change lever 24, PTO switch 23) to control the driving of the PTO shaft 16 and to be moved from a neutral position Qn, Qx to a driving position Q1, Q2, Q3, Qb, Qz. When the PTO operation actuator 24, 23 is in the neutral position Qn, Qx, the PTO shaft 16 is in the stopped state and the controller 60 allows the automatic steering during rearward travel of the vehicle body 3. Upon movement of the PTO operation actuator 24, 23 to the driving position Q1, Q2, Q3, Qb, Qz, the controller 60 prohibits the automatic steering during rearward travel of the vehicle body 3 and the PTO shaft 16 is allowed to be driven.

With the above configuration, upon movement of the PTO operation actuator 24, 23 to a driving position Q1, Q2, Q3, Qb, Qz to drive the PTO shaft 16, automatic steering during rearward travel is disallowed. When the PTO operation actuator 24, 23 is in the neutral position Qn, Qx and the PTO shaft 16 is in the stopped state, automatic steering during rearward travel is allowed. This makes it possible to stably and safely perform automatic steering during rearward travel of the working vehicle 1.

In one or more preferred embodiments, the working vehicle 1 may further include a position detector 40 to detect a position of the vehicle body 3, a defining switch 51 to be operated to issue an instruction to define a reference travel line L1 based on which the automatic steering is performed, and a steering switch 52, 54 to be operated to issue an instruction to start or stop the automatic steering. The controller 60 may be configured or programmed to define the reference travel line L1 in response to an operation of the defining switch 51 based on positions of the vehicle body 3 that were detected by the position detector 40 while the vehicle body 3 was manually steered to travel. The controller 60 may be configured or programmed to, if the automatic steering during rearward travel of the vehicle body 3 is allowed, start the automatic steering in response to an operation of the steering switch 52, 54 to start the automatic steering, perform the automatic steering based on the reference travel line L1 and on the position of the vehicle body 3 detected by the position detector 40, and stop the automatic steering in response to an operation of the steering switch 52, 54 to stop the automatic steering. The controller 60 may be configured or programmed to, if the automatic steering during the rearward travel of the vehicle body 3 is prohibited, not start or stop the automatic steering in response to the operation of the steering switch 52, 54.

With the above configuration, by operating the defining switch 51 and the steering switch 52, 54, it is possible to reliably and stably perform automatic steering during rearward travel of the working vehicle 1. It is also possible to ensure safety, because the automatic steering during rearward travel is not started while it is prohibited even if the steering switch 52, 54 is operated to start the automatic steering.

In one or more preferred embodiments, the working vehicle 1 may further include a notifier (display) 45 to provide a notification indicating that the automatic steering during rearward travel of the vehicle body 3 is prohibited. This makes it possible to eliminate or reduce the likelihood that, when the automatic steering during rearward travel of the working vehicle 1 is prohibited and the automatic steering is not performed, the operator of the working vehicle 1 will mistakenly believe that the working vehicle 1 is broken.

In one or more preferred embodiments, the notifier 45 may be operable to further provide a notification including guidance which is a prompt for the PTO shaft 16 to be stopped. This makes it possible for the operator of the working vehicle 1 to recognize that automatic steering during rearward travel is prohibited because the PTO shaft 16 is in the driven state and that the automatic steering during rearward travel will be allowed when the PTO shaft 16 is stopped.

In one or more preferred embodiments, the notifier 45 may be operable to provide the notification when an instruction to start the automatic steering is issued, if the automatic steering during rearward travel of the vehicle body 3 is prohibited. This allows the operator to recognize that, for example, automatic steering during rearward travel is prohibited and/or that the prohibition is because of the PTO shaft 16 in the driven state, when the operator wishes to start the automatic steering of the working vehicle 1. It is also possible to reduce the frequency of notifications by the notifier 45, making it possible to eliminate or reduce the likelihood that the operator will be overwhelmed by the notifications and to reduce power consumption.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:

a vehicle body to be manually steered with a steering wheel or automatically steered to travel forward or rearward;

a controller configured or programmed to perform automatic steering of the vehicle body;

an operator's seat on the vehicle body;

a console located forward of the operator's seat or located on one side of the operator's seat;

a first manual operator for automatic steering provided in or on the console and including a first switch to be operated to instruct the controller; and a second manual operator for automatic steering attachable at a location rearward of the operator's seat and including a second switch, having a same function as the first switch, to be operated to instruct the controller, wherein the controller is configured or programmed to, upon operation of one of the first and second switches, disable any operation of the other of the first and second switches until ending the automatic steering of the vehicle body.

2. The working vehicle according to claim 1, wherein:

the first manual operator and the second manual operator include, as the first switch and the second switch having the same function, respective steering switches to be operated to instruct the controller to start or stop the automatic steering; and the controller is configured or programmed to:

start the automatic steering of the vehicle body upon operation of one of the respective steering switches to instruct the controller to start the automatic steering;

disable any operation of the other of the respective steering switches to instruct the controller to start or stop the automatic steering during performing of the automatic steering of the vehicle body started as instructed by the one of the respective steering switches; and end the automatic steering of the vehicle body started as instructed by the one of the respective steering switches upon operation of the one of the respective steering switches to instruct the controller to stop the automatic steering.

3. The working vehicle according to claim 1, further comprising:

a position detector to detect a position of the vehicle body; wherein the first manual operator or each of the first and second manual operators includes:

a defining switch to be operated to instruct the controller to define a reference travel line based on which the controller is allowed to perform the automatic steering of the vehicle body; and a correction switch to be operated to instruct the controller to correct the position of the vehicle body detected by the position detector; and the controller is configured or programmed to:

define the reference travel line based on positions of the vehicle body detected by the position detector upon operation of the defining switch at points where travel of the vehicle body manually steered with the steering wheel is started and ended; and during performing of the automatic steering of the vehicle body, correct the position of the vehicle body upon operation of the correction switch to instruct the controller to correct the position of the vehicle body.

4. The working vehicle according to claim 1, further comprising:

a position detector to detect a position of the vehicle body, wherein:

the first manual operator and the second manual operator include, as the first and second switches having the same functions, respective correction switches to be operated to instruct the controller to correct the position of the vehicle body detected by the position detector; and the controller is configured or programmed to, upon operation of one of the respective correction switches during performing of the automatic steering of the vehicle body;

the controller is configured or programmed to, upon operation of one of the respective correction switches during performing of the automatic steering of the vehicle body:

correct a position of the vehicle body; and disable any operation of the other of the respective correction switches until ending the automatic steering of the vehicle body.

5. The working vehicle according to claim 1, wherein the second manual operator is electrically connected to the controller by an electric wire routed from the location rearward of the operator's seat to the console through a side portion of the vehicle body.

6. The working vehicle according to claim 1, further comprising:

a protection structure to protect the operator's seat; wherein the second manual operator is attachable to and detachable from the protection structure.

7. The working vehicle according to claim 6, wherein:

the protection structure includes:

pillars extending upward from a left rear portion and a right rear portion of the vehicle body, respectively; and a beam connecting upper ends of the pillars; and the second manual operator includes:

a housing attachable to and detachable from any of the pillars; and an operable key provided on a surface of the housing other than a mount surface for contact with the pillar.

8. The working vehicle according to claim 6, further comprising a falling preventer to prevent the second manual operator from falling out of the protection structure.

9. The working vehicle according to claim 7, further comprising a falling preventer to prevent the second manual operator from falling out of the protection structure.

10. The working vehicle according to claim 2, further comprising:

a protection structure to protect the operator's seat; wherein the second manual operator is attachable to and detachable from the protection structure.

11. The working vehicle according to claim 10, wherein:

the protection structure includes:

pillars extending upward from a left rear portion and a right rear portion of the vehicle body, respectively; and a beam connecting upper ends of the pillars; and the second manual operator includes:

a housing attachable to and detachable from any of the pillars; and an operable key provided on a surface of the housing other than a mount surface for contact with the pillar.

12. The working vehicle according to claim 10, further comprising a falling preventer to prevent the second manual operator from falling out of the protection structure.

13. The working vehicle according to claim 11, further comprising a falling preventer to prevent the second manual operator from falling out of the protection structure.

14. The working vehicle according to claim 3, further comprising:

a protection structure to protect the operator's seat; wherein the second manual operator is attachable to and detachable from the protection structure.

15. The working vehicle according to claim 14, wherein:

the protection structure includes:

pillars extending upward from a left rear portion and a right rear portion of the vehicle body, respectively; and a beam connecting upper ends of the pillars; and the second manual operator includes:

a housing attachable to and detachable from any of the pillars; and an operable key provided on a surface of the housing other than a mount surface for contact with the pillar.

16. The working vehicle according to claim 14, further comprising a falling preventer to prevent the second manual operator from falling out of the protection structure.

17. The working vehicle according to claim 15, further comprising a falling preventer to prevent the second manual operator from falling out of the protection structure.

18. The working vehicle according to claim 4, further comprising:

a protection structure to protect the operator's seat; wherein the second manual operator is attachable to and detachable from the protection structure.

19. The working vehicle according to claim 18, wherein:

the protection structure includes:

pillars extending upward from a left rear portion and a right rear portion of the vehicle body, respectively; and a beam connecting upper ends of the pillars; and the second manual operator includes:

a housing attachable to and detachable from any of the pillars; and an operable key provided on a surface of the housing other than a mount surface for contact with the pillar.

20. The working vehicle according to claim 18, further comprising a falling preventer to prevent the second manual operator from falling out of the protection structure.

* * * * *